(12) United States Patent
Chandaria

(10) Patent No.: US 11,269,308 B2
(45) Date of Patent: Mar. 8, 2022

(54) METHOD AND APPARATUS FOR CREATING AND MANAGING SMART PROGRAMMABLE LOGIC CONTROLLER (PLC) SOLUTIONS

(71) Applicants: CIAMBELLA LTD., Tortola (VG); Trisala Chandaria, New York, NY (US)

(72) Inventor: Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 11 days.

(21) Appl. No.: 16/767,367

(22) PCT Filed: Dec. 3, 2018

(86) PCT No.: PCT/US2018/063704
§ 371 (c)(1),
(2) Date: May 27, 2020

(87) PCT Pub. No.: WO2019/109108
PCT Pub. Date: Jun. 6, 2019

(65) Prior Publication Data
US 2020/0387129 A1 Dec. 10, 2020

Related U.S. Application Data

(60) Provisional application No. 62/593,370, filed on Dec. 1, 2017.

(51) Int. Cl.
*G02B 6/12* (2006.01)
*G02B 6/34* (2006.01)
(Continued)

(52) U.S. Cl.
CPC ......... *G05B 19/056* (2013.01); *G05B 19/054* (2013.01); *G05B 19/058* (2013.01); *G06F 8/34* (2013.01)

(58) Field of Classification Search
CPC .. G05B 19/056; G05B 19/054; G05B 19/058; H05B 47/11; H05B 47/18; H05B 47/185;
(Continued)

(56) References Cited

U.S. PATENT DOCUMENTS 8,055,386 B2    11/2011    McCoy et al.
8,806,085 B2 *    8/2014    Mathason .......... G05B 19/0423
                                                                                      710/33

(Continued)

FOREIGN PATENT DOCUMENTS

WO    WO-2016182913 A1    11/2016

OTHER PUBLICATIONS

Shi et al., Design and implementation of signal generator based on AD9850, 3 pages (Year: 2011).*
(Continued)

*Primary Examiner* — Thuy Dao
(74) *Attorney, Agent, or Firm* — Moser Taboada

(57) ABSTRACT

Method for creating and managing programmable logic controller (PLC) solution comprises connecting existing PLC solution to a cloud network, and connecting from a user device to a virtualization server. A graphical representation of a pin layout of a PLC is displayed on a GUI on the user device. An input comprising selection of a first pin, a sensor or an actuator configured to be coupled with the PLC via the first pin, and a parameter for the operation of the selected sensor or the selected actuator is received on the GUI. The received input is sent from the user device to the virtualization server. An executable PLC application for execution on the PLC is received on the user device. The PLC application is configured to operate and/or monitor the PLC according to the received input. The PLC application is sent to the PLC for being deployed on the PLC.

15 Claims, 14 Drawing Sheets

S456: RECEIVE AN INPUT TO MODIFY THE CODE DEPLOYED ON THE CBD

S458: SEND THE RECEIVED INPUT TO THE VIRTUALIZATION SERVER

S460: RECEIVE MODIFIED CODE FOR THE CBD

S462: SEND THE MODIFIED CODE TO THE CBD FOR DEPLOYMENT

(51) Int. Cl.
  *H04J 14/02* (2006.01)
  *G02B 6/28* (2006.01)
  *G02F 1/01* (2006.01)
  *G02F 1/017* (2006.01)
  *G05B 19/05* (2006.01)
  *G06F 8/34* (2018.01)

(58) Field of Classification Search
  CPC ..... Y02B 20/40; G06F 11/3636; G06F 1/025; G06F 8/34; G02B 6/12004; G02B 6/12007; G02B 6/12011; G02B 6/12019; B82Y 20/00
  See application file for complete search history.

(56) References Cited

U.S. PATENT DOCUMENTS

| | | | |
|---|---|---|---|
| 8,924,800 B2* | 12/2014 | Kao | G05B 19/058 714/724 |
| 2003/0061274 A1 | 3/2003 | Lo | |
| 2003/0204560 A1 | 10/2003 | Chen et al. | |
| 2005/0256964 A1 | 11/2005 | Dube | |
| 2015/0286362 A1 | 10/2015 | Chandaria et al. | |
| 2015/0331406 A1 | 11/2015 | Wang | |
| 2016/0327925 A1 | 11/2016 | Leonelli et al. | |
| 2017/0180462 A1 | 6/2017 | Chandaria et al. | |

OTHER PUBLICATIONS

International Search Report and Written Opinion dated Apr. 22, 2019 for PCT Application No. PCT/US2018/063704.

Anonymous: "Modbus—Wikipedia", Jul. 8, 2017 (Jul. 8, 2017), pp. 1-11, XP055817337, Retrieved from the Internet:URL:http://web.archive.org/web/20170708162019/https://en.wikipedia.org/wiki/Modbus [retrieved on Jun. 23, 2021].

Anonymous: "Programmable logic controller—Wikipedia", Sep. 1, 2017 (Sep. 1, 2017), pp. 1-13, XP055798706, Retrieved from the Internet:URL:https://en.wikipedia.org/w/index.php?title=Programmable_logic_controller&oldid=798397210 [retrieved oncApr. 28, 2021].

Supplementary European Search Report dated Jun. 24, 2021 for Application No. EP 18884443.

* cited by examiner

400

---

S402: CONNECTING THE EXISTING PLC SOLUTION TO A CLOUD NETWORK

S404: CONNECTING TO A VIRTUALIZATION SERVER

S406: DISPLAY A GRAPHICAL REPRESENTATION OF A PIN PLAYOUT OF A PLC

S408: RECEIVE AN INPUT CORRESPONDING TO A FIRST PIN, A SENSOR OR AN ACTUATOR FOR THE FIRST PIN, AND A PARAMETER FOR THE OPERATION THEREOF

S410: SEND THE RECEIVED INPUT TO THE VIRTUALIZATION SERVER

S412: RECEIVE AN EXECUTABLE PLC APPLICATION FOR EXECUTION ON THE PLC

S414: SENDTHE PLC APPLICATION TO THE PLC FOR BEING DEPLOYED ON THE PLC

— 416

---

S418: RECEIVE A SELECTION OF A PREDEFINED PROCESS FOR EXECUTION ON THE VIRTUALIZATION SERVER

S420: SEND THE SELECTION OF THE PREDEFINED PROCESS TO THE VIRTUALIZATION SERVER

S422: RECEIVE AN EXECUTABLE CODE SNIPPET FOR BEING EXECUTED ON A CBD

S424: SENDING THE EXECUTABLE CODE SNIPPET TO THE CBD FOR BEING DEPLOYED ON THE CBD

— 426

FIG. 4A

METHOD AND APPARATUS FOR CREATING AND MANAGING SMART PROGRAMMABLE LOGIC CONTROLLER (PLC) SOLUTIONS

BACKGROUND

Field of the Invention

Embodiments of the present invention generally relate to programmable logic controllers.

Background

Programmable logic controllers (PLCs) are widely used in industrial applications, where PLCs find use as controllers of machinery, instruments, devices and the like. Traditionally, PLCs comprise logic circuits that replace electromechanical switches (relays) such that a solid-state computer can be programmed to directly control industrial systems.

A PLC has many "input" terminals, through which it interprets "high" and "low" logical states from sensors and switches. It also has many output terminals, through which it outputs "high" and "low" signals to power lights, solenoids, actuators, small motors, and other devices lending themselves to on/off control. In an effort to make PLCs easy to program, their programming language is designed to resemble ladder logic diagrams. Thus, an industrial electrician or electrical engineer accustomed to reading ladder logic schematics feels comfortable programming a PLC to perform the same control functions previously performed by relays.

PLCs are industrial computers, and as such their input and output signals are typically at the mains voltage (e.g., 120 volts AC or 220 volts AC), just like the electromechanical control relays they were designed to replace. Although some PLCs have the ability to input and output low-level DC voltage signals of the magnitude used in logic gate circuits, this is the exception and not the rule. Presently, PLC coding is performed manually and is executed to perform local control of industrial systems. Despite various advances in the art, the PLC-controlled industrial systems exist in silos, which are programmed and managed using conventional techniques.

Therefore, there exists a need for smart PLC solutions.

SUMMARY

The present invention relates generally to a method and apparatus for creating and managing smart programmable logic controller (PLC) solutions. In one embodiment, the method comprises connecting existing PLC solution (112, 120) to a cloud network (108) and connecting from a user device (104) to a virtualization server (122). A graphical representation of a pin playout of a PLC (112) is displayed on a graphical user interface (GUI) (102) on the user device. An input comprising selection of a first pin, a sensor or an actuator configured to be coupled with the PLC via the first pin, and a parameter for the operation of the selected sensor or the selected actuator is received on the GUI. The received input is sent from the user device to the virtualization server. An executable PLC application for execution on the PLC is received on the user device. The PLC application is configured to operate and/or monitor the PLC according to the received input. The PLC application is sent to the PLC for being deployed on the PLC.

In another embodiment, an apparatus for creating and managing smart programmable logic controller (PLC) solutions. In one embodiment comprises a user device comprising a processor and a memory storing processor executable instructions which, when executed by the processor, performs the method for creating and managing smart programmable logic controller (PLC) solutions discussed above.

BRIEF DESCRIPTION OF THE DRAWINGS

So that the manner in which embodiments of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4C depict a flow diagram of a method for creation of the smart PLC functions, according to an embodiment of the present invention.

DETAILED DESCRIPTION

Figure 1:
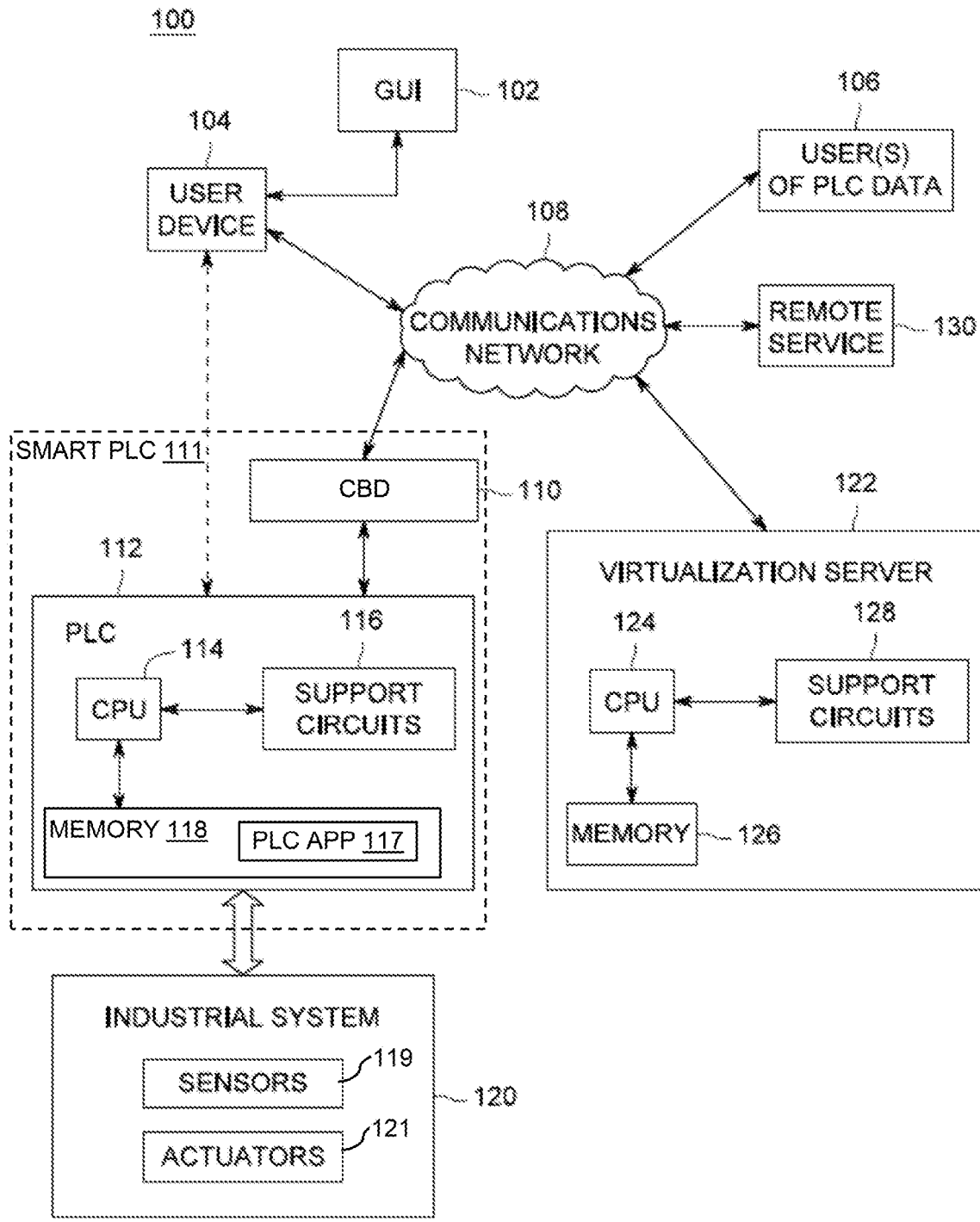
FIG. 1 is a block diagram of a smart programmable logic controller (PLC) system, according to an embodiment of the present invention.

Embodiments of the present invention comprise a method and apparatus for creating and managing smart programmable logic controller (PLC) solutions. More specifically, a method and apparatus is provided to create, deploy, and manage PLC solutions incorporating controller-based devices (e.g., devices having a controller, such as microcontrollers, microprocessors, SoC, MCU, among others), in conventional PLC based industrial systems (e.g., a manufacturing production line, an electric power station, and the like), which are typically remote from a user, extending the Internet of Things (IoT) functionality to PLC systems. The user, using a graphical user interface (GUI) on a user device, builds a solution comprising a controller-based device (CBD) installed in a conventional PLC system. In some embodiments though, pre-defined solution templates comprising may also be presented to the user using the GUI, for selection of predefined solutions, and/or modification to 'customize' a predefined solution.

The solutions rely on the use of a virtualization server, which is typically remote to both the user device and the PLC system. The virtualization server enables a user in generating an application for execution on the PLC (PLC application), code for execution on the CBD (code snippet or automatically generated controller program (AGCP)), provides functionality of predefined processes executed on the virtualization server by virtue of a call placed from the CBD to the virtualization server, access to remote services provided by other remote devices, among other functionalities described in commonly assigned U.S. Pat. Nos. 10,095,495, 10,067,490, 9,830,136, 9,235,383, 9,239,705, 9,619,122, 9,436,439, 9,219,112 and 8,726,285, as well as commonly assigned, published U.S. Patent Applications 2018/0081658 and 2017/0180462, and the U.S. Provisional Patent Application 62/593,370. These patents and applications are incorporated herein by reference in their entireties.

Along with the code (code snippet or AGCP), a library of routines to support and/or facilitate execution of the code may also be placed in the memory of the CBD. The snippet, when executed, sends a call for a predefined process being executed on the virtualization server, and/or sends (directly or via the code virtualization server) data to a remote service provider, and/or further calls a function to be remotely performed on the data by the remote service provider. Embodiments of the present invention use placement of snippets of code to create, monitor, control, reprogram controller-based devices (CBDs) coupled to PLC solutions, enabling creation of IoT-based dynamic, cloud-based smart PLC solutions for conventional industrial systems, which have operated in silos that are challenging to modify. Some embodiments enable changing the code, the input parameters for the code, changing the required output, configuring additional electronic devices (e.g., sensors, actuators, and the like) for use with the CBDs, or changing the configuration of existing solutions.

FIG. 1 depicts a block diagram of a smart programmable logic controller (PLC) system 100, in accordance with an embodiment of the invention. The system 100 comprises a user device 104 and associated graphical user interface (GUI) 102, a virtualization server 122 (also referred to as "code virtualization server"), a smart PLC 111 comprising a PLC 112 and a controller-based device (CBD) 110, and an industrial system 120 being controlled by the PLC 112. A communications network 108 (cloud) communicatively couples the user device 104, the virtualization server 122 and the PLC 112 to one another. In some embodiments, the user device 104 is directly connected to the smart PLC 111. The system 100 may also include users of PLC data 106 that are connected to the network 108, and a remote service provider 130 for providing remote services via the cloud. One or more of the users of PLC data 106 may use the user device 104 to access the PLC data via the GUI 102.

In some embodiments, the smart PLC 111 may include multiple PLCs, including PLCs of different make or type, similar to the PLC 112. The one or more PLCs may be coupled with a single CBD 110. In some embodiments, the system 110 comprises several smart PLCs similar to the smart PLC 111, including smart PLCs having the same configuration as the smart PLC 111, or other configurations in which the number or type of the PLCs is different, or the configuration of the CBD is different from the smart PLC 111. The PLC 112 communicates data to and from the network 108 via the CBD 110, described further with respect to FIG. 2A. The CBD 110 may operate in an edge mode or a gateway mode, and the communication of data to and from the network 108 is done by one or more CBDs configured as the gateway device(s), while other CBDs are configured as edge devices, which communicate with the network 108 through the gateway CBDs. Further, the various edge CBDs and the gateways CBDs may communicate with each other directly or via a mesh network between such CBDs (edge and gateway).

In operation, the user device 104 is coupled to the network 108 when designing, deploying or managing a smart solution for the smart PLC 111 and/or the industrial system 120. In one embodiment, the user device 104 is also coupled to the virtualization server 122 via the network 108 during automatic generation of the PLC application or the code 248 for the CBD 110.

The user or users of PLC data 106 may include services that utilize streaming data. These users may analyze the streaming data using artificial intelligence and/or machine learning algorithms. This analysis may result in suggested improvements for the PLC applications and/or the parameters of those applications. Consequently, the function of the applications can be optimized. These services may also form part of the virtualization server 122.

In some embodiments, a plurality of PLCs may be located in a single installation to control various machines in a factory, for example. These PLCs are then connected to a transceiver that operates as a gateway. Such gateway operation is described in commonly assigned US Patent Application 2016/0328216, herein incorporated by reference in its entirety.

The PLC 112 comprises a central processing unit (CPU) 114, support circuits 116, and a memory 118. The CPU 114 may comprise one or more conventionally available microprocessors or microcontrollers; alternatively, the CPU 114 may include one or more application specific integrated circuits (ASICs) or field programmable gate arrays (FPGAs). The support circuits 116 are well known circuits used to promote functionality of the CPU 114. Such circuits include, but are not limited to, a cache, power supplies, clock circuits, buses, input/output (I/O) circuits including pins, and the like. The CPU 114 may be implemented using a general-purpose computer that, when executing particular software, becomes a specific purpose computer for controlling and managing the operation of the industrial system 120.

The memory 118 may comprise random access memory, read only memory, removable disk memory, flash memory, and various combinations of these types of memory. The memory 118 is sometimes referred to as main memory and may, in part, be used as cache memory or buffer memory. The memory 118 generally stores the operating system (OS), if necessary, of the PLC 112 that can be supported by the CPU capabilities.

The memory 118 may store various forms of application software, such as a PLC application 117 for controlling operation of the PLC 112 and performing functions related to the present invention. For example, the PLC 112 may receive signals from sensors or supply control signals to actuators in the industrial system 120. As described, below, the PLC application 117 may, in whole or in part, be supplied by the virtualization server 122. In one embodiment, the PLC 112 requests a predefined process to be executed virtually, that is, on the virtualization server 122. In one embodiment, data from the industrial system can be streamed to the users of PLC data 106 and/or to the virtualization server 122.

In some embodiments, the PLC application 117 includes a PLC block which enables a ModbusTCP server. The PLC 112 communicates with the CBD 110 via a Modbus client, which connects to the CBD 110 over a ModbusTCP connection. The Modbus connection enables a continuous web-socket connection from the PLC 112 to the virtualization server 122, for example, to stream data, receive updates, among other information exchanges as described herein. In some embodiments, the PLC 112 is connected to the CBD 110 via an Ethernet connection.

The industrial system 120 comprises one or more sensors 119 and actuators 121 that function to implement a conventional industrial system that is controlled by the PLC 112, or multiple PLCs from different vendors. Such industrial systems include factory machinery, measurement instrumentation, medical instrumentation, robot control, assembly line machinery, power plant management and control systems and warehouse management.

The remote service provider 130 provides a cloud-based service(s), such as, FACEBOOK, TWITTER, AMAZON, data storage service, email service, short-message service (SMS), web message service, weather service, geographical location service, internet protocol (IP) address identification service, informational databases (e.g., financial, supply chain, accounting) global positioning system (GPS), and the like. The remote service provider 130 or the remote service(s) 130 is/are accessible via the network 108.

Figure 2A:
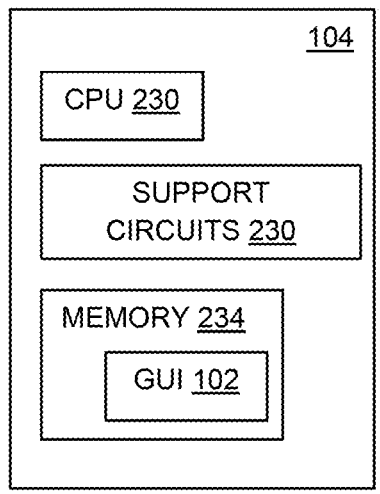
FIGS. 2A, 2B and 2C depict a block diagram showing the functional components and modules of a controller-based device (CBD), a user device, and a virtualization server, respectively, according to an embodiment of the present invention.

As seen in FIG. 2A the CBD 110 comprises a digital controller 240, support circuits 242 and a memory 244, although each device (edge and gateway) includes these components. The device controller 242 may be a microcontroller (e.g., PIC, AVR type, ARM type, and the like) or a SoC (e.g., RASPBERRY PI), or a microprocessor as generally known in the art. The support circuits 244 are well known circuits used to promote functionality of the controller 242. Such circuits include, but are not limited to, a cache, power supplies, clock circuits, buses, input/output (I/O) circuits including pins and the like. The memory 244 may be any form of digital storage used for storing data and executable code or software. Such memory includes, but is not limited to, random access memory, read only memory, disk storage, optical storage, and the like. In some embodiments, the memory 244 stores computer readable instructions corresponding to an operating system (not shown). The memory 244 further stores an automatically generated controller program (AGCP) or a controller program incorporating an automatically generated code snippet, commonly represented by executable code 248 (also referred to as "AGCP"). The code 248 comprises a call 249, for example, a call to a predefined process to be executed on a remote device such as the code virtualization server 122. The code 248 may additionally include other code components including program libraries, necessary for executing the code including the code 248 and the call 249. According to some embodiments, the code 248 is received from the virtualization server 122 (directly or via the user device 104) and installed in the memory 246. The code components are also capable of ensuring that an edge CBD can communicate to the virtualization server 122 via the gateway CBD 110 and that the gateway CBD 110 is capable of allowing such communications. As shown in FIG. 2A, in some embodiments, the call 249 is included in the code 248.

The type of controller may differ from device to device, for example, based on the application of such device and the functionality required. The gateway CBDs additionally include a transceiver capable of communicating with the network 108, other edge CBDs and gateway CBDs. The transceiver (not shown separately) may be wired, wireless or a combination of wired and wireless technologies. The edge CBDs include a transceiver capable of communicating at least with the gateway CBDs, and may be additionally capable of communicating with other edge CBDs, or the network 108. Through the use of gateway CBDs, such as the CBD 110, the PLC 112 becomes a smart, Internet of Things (IoT) device that can be managed and programmed remotely from a user device, using GUIs, by selecting and configuring desired functionality; generating and deploying executable code automatically for and on the CBD 110 and/or the PLC 112; accessing data of the PLC and/or industrial system operation; modifying the executable code on the CBD 110 and/or the PLC 112.

Figure 2B:
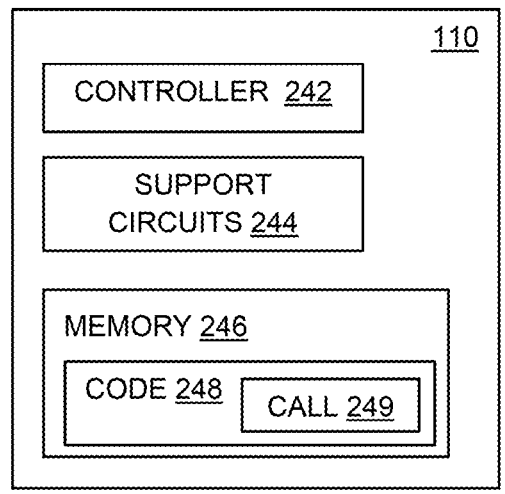

As shown in FIG. 2B, the user device 104 comprises a CPU 230, support circuits 232 and a memory 234. The CPU 230 processes inputs and outputs to the devices, and may be any commercially available processor, microprocessor, microcontroller, and the like. The support circuits 232 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, or other user interaction mechanism. The memory 234 may be any form of digital storage used for storing data and executable software. Such memory includes, but is not limited to, random access memory, read only memory, disk storage, optical storage, and the like. The memory 234 stores computer readable instructions corresponding to an operating system (not shown) and a graphical user interface (GUI) 102. In some embodiments, the GUI 102 is software resident on the virtualization server 122, the GUI 102 accessed by and rendered via a browser on the user device 104.

The user device 104 is a general-purpose computer such as a desktop or laptop computer having the GUI 102. Through the GUI 102, a user develops application programs for the PLC as well as request virtualization services code 248 (i.e., code snippets) from the virtualization server 122 for insertion in the CBD 110 for enabling smart PLC 111 operation. The code 248, when executed on the CBD 110, calls predefined processes to be performed by the virtualization server 122. The processes can include services locally implemented by the virtualization server 122, or remote service(s) 130 accessed via the cloud. The services include, without limitation, data manipulation, computations, searches, postings to such services as TWITTER or FACEBOOK, data transmissions, and the like. The services are typically not able to be performed locally by the PLC CPU 114 and, as such, are virtualized to provide enhanced capabilities to the PLC 112 that, until now, could not be performed.

Figure 2C:
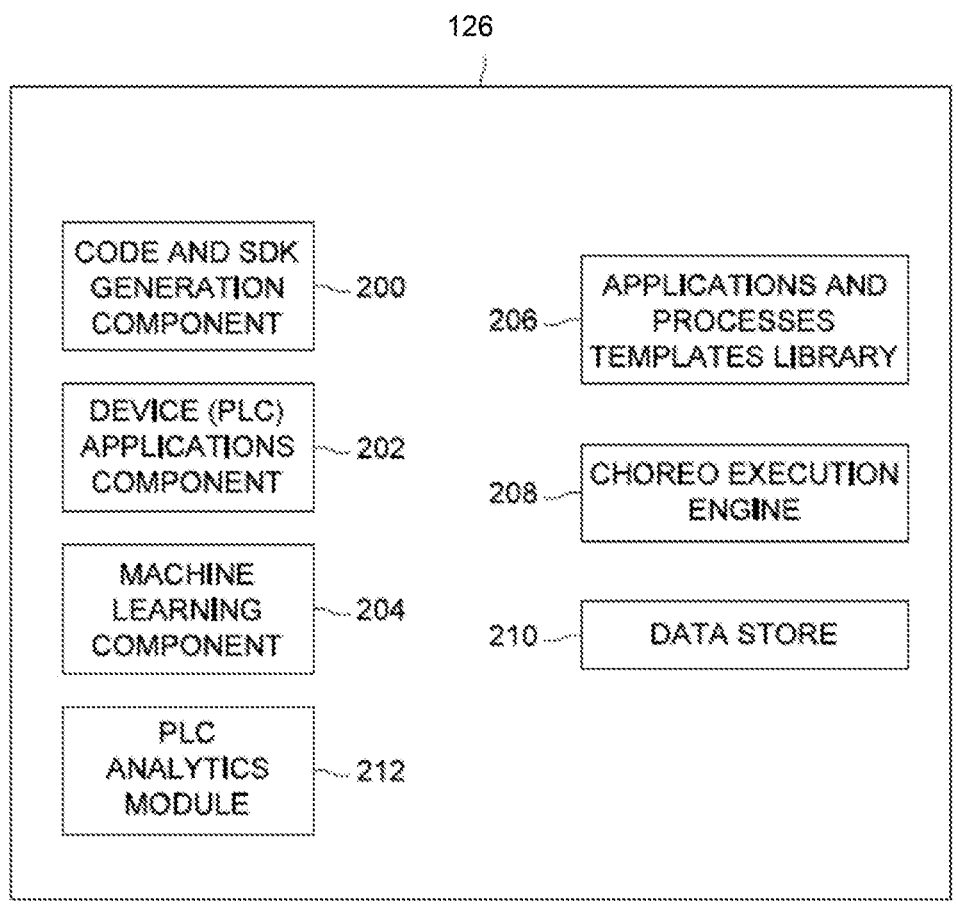

As shown in FIGS. 1 and 2C, the virtualization server 122 comprises a central processing unit (CPU) 124, a memory 126 and support circuits 128. The CPU 124 may comprise one or more conventionally available microprocessors or microcontrollers; alternatively, the CPU 124 may include one or more application specific integrated circuits (ASICs) or field programmable gate arrays (FPGAs). The support circuits 128 are well known circuits used to promote functionality of the CPU 124. Such circuits include, but are not limited to, a cache, power supplies, clock circuits, buses, input/output (I/O) circuits, and the like. The CPU 124 may be implemented using a general-purpose computer that, when executing particular software, becomes a specific purpose computer for providing virtualization and data processing services.

The memory 126 may comprise random access memory, read only memory, removable disk memory, flash memory, and various combinations of these types of memory. The memory 126 is sometimes referred to as main memory and may, in part, be used as cache memory or buffer memory. The memory 126 generally stores the operating system (OS) (not shown) of the server 122 that can be supported by the CPU capabilities. In some embodiments, the OS may be one of a number of commercially available operating systems such as, but not limited to, LINUX, Real-Time Operating System (RTOS), WINDOWS, and the like.

FIG. 2C is a block diagram showing the functional components and modules of the virtualization server 122, for example, as may be stored in the memory 126. The server 122 provides a variety of functions (services) to the user device 104 and/or the smart PLC 111. These functions are generally accessible to the user device 104 via the GUI 102. The virtualization server 122 comprises a code and software development kit (SDK) generation component 200, a device (e.g., PLC) applications component 202, a machine learning component 204, applications and processes template library 206, choreo execution engine 208, data store 210 and PLC analytics module 212.

The code and SDK component 200 is configured to generate executable code and supporting code components for the CBDs, for example, the code 248 for the CBD 110, based on the inputs received from the GUI 102 on the user device 104 to facilitate a smart PLC application development. In one embodiment, a predefined process for execution on the virtualization server 122 is provided as input via the GUI 102. When such an input is received, the component 200 includes a call 249 in the code 248, where execution of the code 248 by the CBD 110 places the call 249 to the virtualization server 122 to execute the predefined process on the virtualization server 122. According to an embodiment, the call 249 includes parameters required to execute the predefined process, while in other embodiments, execution of the predefined process does not need parameters to be supplied via the call 249. Operation of the component 200 is also described in commonly assigned U.S. Pat. No. 9,239,705, herein incorporated by reference in its entirety.

The device applications component 202 includes prewritten applications for PLC devices, for example, the PLC application 117, among several others, and is accessed by the user device 104, via the GUI 102, to supply specific PLC application(s) for use with specific PLC(s). For example, a user may browse the component 202 and identify the PLC application 117 for being deployed on the PLC 112.

The machine learning component 204 comprises artificial intelligence (AI) or machine learning (ML) algorithms that are used to analyze PLC 112 data (which includes data from the operation of the industrial system 120). The component 204 may be implemented on the virtualization server 122, or may be located elsewhere, such as, in the users of PLC data 106, or implemented as a service by the remote service(s) 130. The component 204 analyzes the PLC data to generate improvements in PLC application 117, the code 248 for the CBD 110, and/or updates to parameters that control the PLC application 117, the code 248, or both. Consequently, the component 204 optimizes the operation of the smart PLC 111 and the industrial system 120 associated therewith. According to some embodiments, one or more MU/AI algorithms from the component 204 are selectable via a GUI (e.g., the GUI 102). Further, the user may also select or define, using the GUI, a set of constraints on the process or application outputs and define a set of behavioral targets for the selected predefined process or PLC application to achieve based on modification by the ML/AI algorithms (e.g., acceptable latencies, acceptable brackets for triggering of alerts, and the like). Behavioral targets are states that the application needs to reach over time, and are optimal target that the algorithms will try to achieve, for example, power saving, calibration of sensors, predictive maintenance, maximization or minimization of an output, among others. In some embodiments, the ML/AI algorithms are used to conduct predictive analysis based on the behavioral targets as discussed above. Based on the predictive analysis, and all necessary files and libraries, as well as power management functionalities, network connectivity, sanity checks, errors management and the like, the PLC application and/or the code for the CBD is modified, to generate an enhanced PLC application and/or code for CBD. Such an enhanced PLC application and/or code for CBD are exceptionally robust for a given application.

The applications and processes templates library 206 comprises a database of predefined processes (or "choreos") that are executed upon receiving the call 249 from the CBD 110. One or more predefined processes can be selected to create full applications for a particular CBD. The library 206 may be accessed and searched by the user device 104, and in some embodiments, the virtualization server 122 sends an index of the predefined processes available for selection to the GUI 102.

The code and SDK component 200, the device application component 202, and the library 206, form an exhaustive pool of the available solutions for the PLC system (comprising the components of such conventional industrial system 120, PLC 112, CBD 110 required to interface with such PLCs 112, all the processes required to operate the CBD 110, and all the parameters thereof. Each of the code and SDK component 200, the device application component 202, and the library 206 may be updated to add, remove or edit the available solutions. Such updates can be used to enhance the functionalities available to the controller device based remote solutions, without requiring an upgrade to the controller devices themselves.

Process parameters (for PLC application or code for the CBD), connection profiles (for connections between PLC 112, the CBD 110, the virtualization server 122 and the user device 104), connection parameters and protocols are also specified. Examples of such parameters are illustrated, without limitation, in Table 1.

TABLE 1

| Type | Parameter | Example/Comments |
|---|---|---|
| General | Profile name | Name of a set of parameters (includes all sub-profiles) |
| Hardware Profile | Hardware type | Arduino Uno, Arduino Yun,, Texas Instruments CC3200, Rasberry PI, etc. |
| Hardware Profile | Processor type | AVR, ARM, PIC, etc. |
| Hardware Profile | Network Hardware | Arduino Wifi Shield, Built-in Ethernet, Ethernet Shield, BLE Shield, Built-in BLE |
| Credential Profile | Username | Username for a webservice like Facebook, . . . |
| Credential Profile | Password | Password for a webservice like Facebook, . . . |
| Credential Profile | API Key | Developer API key given by webservices like Facebook, . . . There can be several API keys |
| Credential Profile | API Secret | Developer API secret given by webservices like Facebook, . . . There can be several API secrets |
| Connection Profile | Connection Profile name | Allows to select different Connection profiles |

TABLE 1-continued

| Type | Parameter | Example/Comments |
|---|---|---|
| Connection Profile | Type | Wifi, Bluetooth, Zigbee, Z-WAVE, THREAD, LORA, 6LOWPAN, . . . |
| Connection Profile | Security Type | WPA, WEP, unsecured, . . . |
| Connection Profile | SSID | Wifi network identifier |
| Connection Profile | Password | Network password |
| Connection Profile | Transport Protocol | MQTT, CoAP, HTTP/S, TCP/IP . . . |
| Connection Profile | Role | Gateway or Edge |
| Setup Profile | Output Pin | Indicates which Output Pin is selected on the processor (multiple Output Pins can be selected) |
| Setup Profile | Input Pin | Indicates which Input Pin is selected on the processor (multiple Input Pins can be selected) |
| Setup Profile | Pin Rule | Specifies what rule is applied to a given Pin (Input or Output). For example: If Temperature = 19 then write High to Pin 12 |
| Input Profile | Required Input Parameter | Also called variable. Can be any parameter a choreo needs to be executed. Can be multiple Input Parameters. For example, a choreo sending an email will need Input Parameters like: Email address, Subject, Body, Attachment, . . . |
| Input Profile | Optional Input Parameter | Optional Input parameters are used to add Parameters that are not necessary. Multiple Optional Input Parameters are possible. For example, a choreo sending an email has optional Input Parameters like: CC, BCC or encryption type |

The choreo execution engine 208 executes the choreos or the predefined processes on the virtualization server 122, when the remote call 249 is received. The predefined processes are not physically present on the CBD and also not executed by the CBD, however, such predefined processes are a part of and extend the CBD's functionality. Therefore, the predefined processes are virtual code (that is, not physical or real code) for the CBD 110, which is able to perform services that are virtualized via the call 249 embedded in the code 248. The use of choreos and virtualization is also described in detail in commonly assigned U.S. Pat. No. 9,436,439, herein incorporated by reference in its entirety. By using the call 249, part of code 248 is performed by the CBD 110, but some of the functionality is executed by the virtualization server 122. In this manner, the integration of a conventional PLC 112 with a simple IoT device, such as the CBD 110, using the virtualization server 122, transforms the conventional PLC 112 to a smart, dynamically programmable, IoT enabled PLC 111, which has functionality far exceeding the local capability of the PLC 112.

The data store 210 stores data such as software parameters or PLC data. The software parameters include parameters for executing the PLC application on the PLC or the code 248 on the CBD 110, and are received as input via the GUI 102, or from a destination on the cloud specified via the GUI 102. The PLC data is received from the smart PLC 111, and includes operational information of one or more of the PLC 112, the CBD 110 or the industrial system 120. The information from the data store 210 is utilized by the choreo execution engine 208 to execute the predefined process, and by the machine learning component 204. The data store 208 may also include visualization information generated using the PLC data, for example, to represent the PLC data graphically on the GUI 102 or to the users of the PLC data 106. In some embodiments, the data store 210 stores the PLC (112) runtime information or PLC data, which may be utilized to conduct analyses based on the ML/AI algorithms.

The PLC analytics module 212 processes the streaming PLC data to glean additional understanding about the operational efficiency of the smart PLC. The processing includes applying analytics PLC data streams to determine patterns and correlations between data within separate streams to facilitate optimization of the industrial system 120. The processing may also include converting the streaming PLC data or the analyzed PLC data to visualization information, which is readily rendered on the GUI 102 or to the users of the PLC data 106. The PLC analytics module 212 may be located in the virtualization server 122 or the users of PLC data 106.

Figure 3:
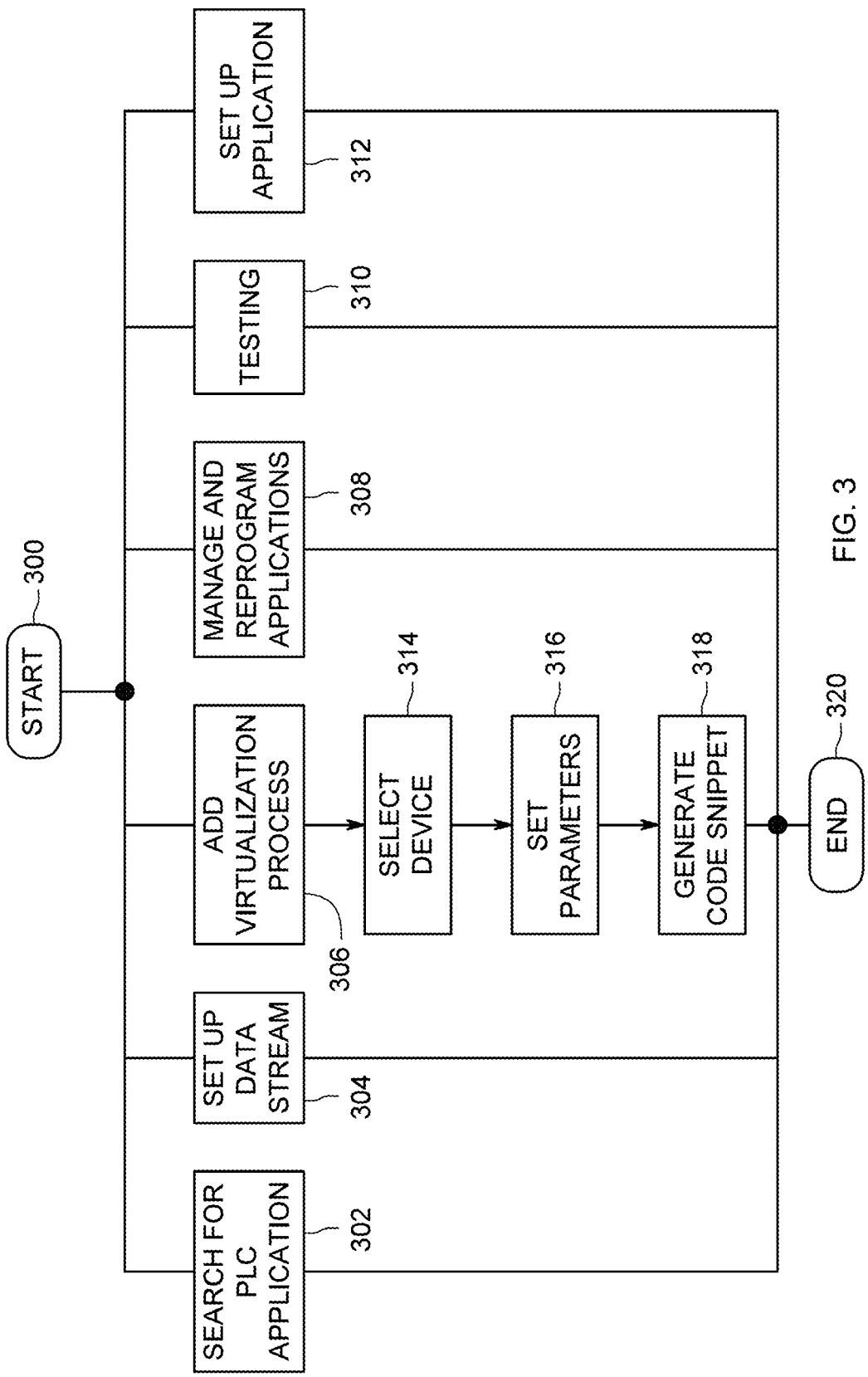
FIG. 3 is a flow diagram showing the smart PLC functions that are controlled via a graphical user interface on the user device, according to an embodiment of the present invention.

FIG. 3 is a flow diagram showing the smart PLC functions that are controlled via the GUI 102 of the user device 104, in accordance with an embodiment of the invention. From a start position 300, a user may select a number of functions to be performed. These functions comprise, as examples, but are not limited to, search for a PLC application 302, set up data streaming 304, add a virtualization process to a smart PLC 306, manage and reprogram a PLC application and/or a code for the CBD 308, perform testing of a PLC application and/or a code for the CBD 310, or set up an application and/or a code for the CBD 312.

If a user selects to search for an application 302, a GUI interface (in the GUI 102) presents a searchable list of PLC applications from the device applications component 202. The user may select a particular PLC or PLC CPU that will cause the list to be reduced to only applications related to the particular type of PLC or PLC CPU. Upon selecting a particular application, the application will be downloaded to the user device 104. The PLC application may be edited or used as is. The completed PLC application (e.g., the PLC application 117) is downloaded to the PLC memory and deployed.

The user may select to set up data streaming 304. Typically, this is accomplished by having the CBD 110 stream the PLC data from the PLC 112. The set up process involves receiving as input, on the GUI 102, certain data or parameters to be streamed, a particular format for the data or parameters, or a particular protocol using which the data should be streamed. On one embodiment, the CBD 110, executing the code 248, directly streams the PLC data according to the required input. In one embodiment, the data streaming 304 is accomplished by the code 248 which includes a call (e.g. the call 249) to a predefined process on the virtualization server 12 for streaming. The code 248 streams the data to the predefined process on the virtualization server 122, which in turn processes the PLC data transmits the PLC data from the virtualization server 122 according to the desired inputs. The PLC data is transmitted to the users of the PLC data 106, which may include a user associated with the user device 104.

The user may elect to add a virtualized process 306, that is, a process executed on the virtualization server 122 via the call 249 when the code 248 is executed on the CBD 110. At step 314, the user selects a device (e.g., the CBD 110, and if multiple PLCs are associated with the CBD, then the specific PLC CPU for which the virtualized process is being added). At step 316, the user sets parameters for the execution of the predefined process. At step 318, the virtualization server 122 creates code (e.g., the code 248 comprising a code snippet or an entire program for the CBD 110) to be inserted into the CBD 110. The code 248 includes a call (e.g., the call 249) to the predefined process on the virtualization server 122. In some embodiments, the code 248 is inserted by a user using the GUI 102 of the user device 104 into the CBD 110. When the code 248 is executed on the CBD 110, the call 249 is sent from the smart PLC 111 (CBD 110) to the virtualization server 122, where, the choreo execution engine 208 executes the predefined process stored in the library 206.

The user may manage and reprogram the PLC applications 308. For example, the user may select deployed applications (PLC application 117 on the PLC 112, or the code 248 deployed on the CBD 110), via the GUI 102 for managing or reprogramming. The user provides updated or edited parameters or updated design inputs for the PLC application 117 or the code 248. Based on such inputs, the PLC application 117 is updated in a manner similar to step 312 described below, and the code 248 is updated according to steps 306, 314-318 described above.

The user may test applications and remote call operation 310 in a "sandbox" mode such that the code is tested without impacting PLC operation. Such testing enables a user to produce "bullet proof" industrial applications for the PLC without affecting the deployed PLC 112 in the industrial system 120.

The user may set up PLC applications from the user device 312. For example, the user may search for an application for a PLC according to step 302 (e.g., PLC application 117 for the PLC 112) in the device application component 202 on the virtualization server 122, using the GUI 102. The user may also provide as input, via the GUI 102, data storage locations on the PLC 112, and enter parameters for the PLC application 117 operation, for example, using ladder logic methodology as generally known in the art. Based on the received input, the component 202 generates the PLC application 117, which may be downloaded to the user device 104, which deploys the PLC application 117 to the PLC 112. In some embodiments, the PLC application is sent from the virtualization server 122 directly to the PLC 112 for deployment.

Figure 4B:
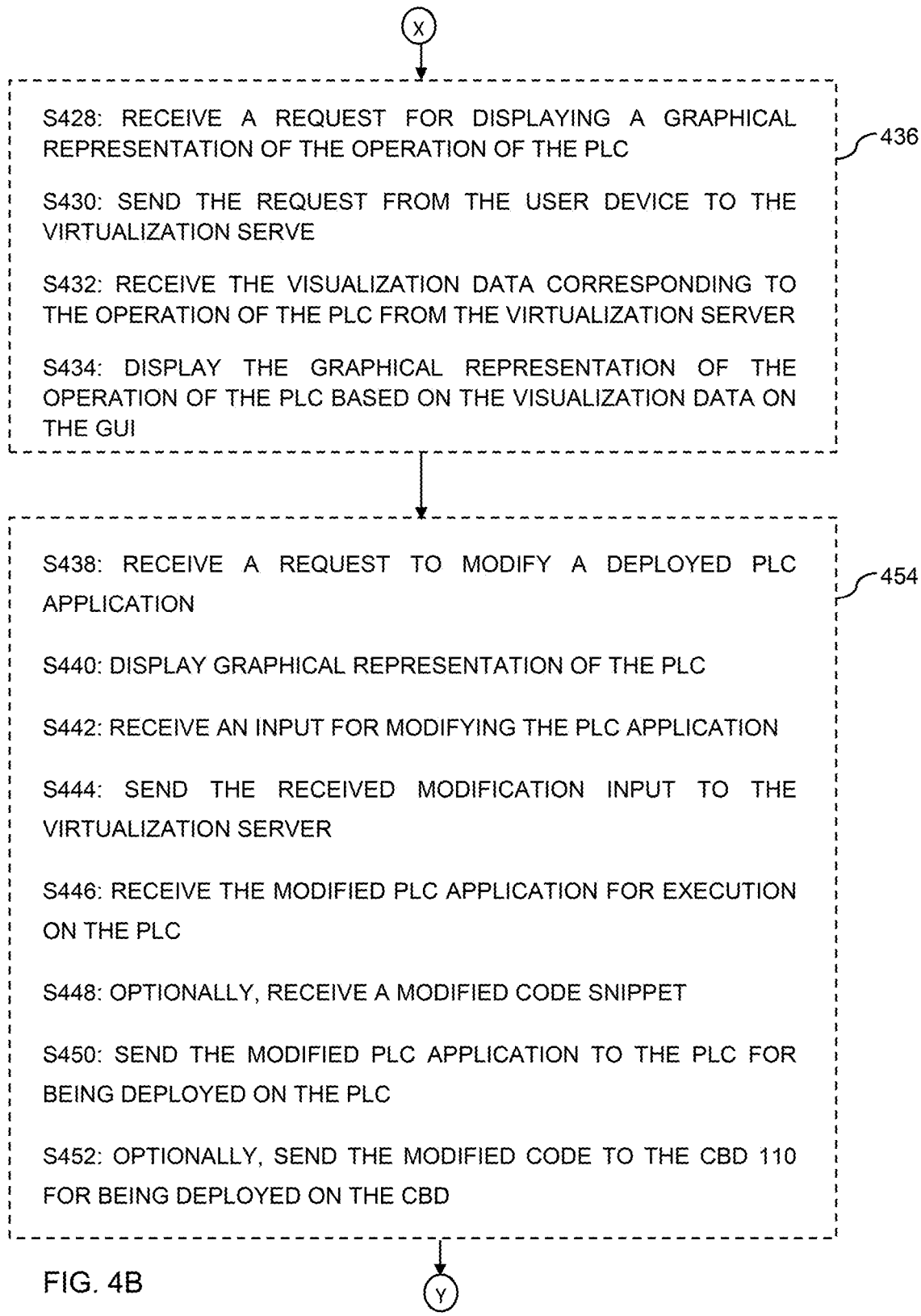
Figure 4C:
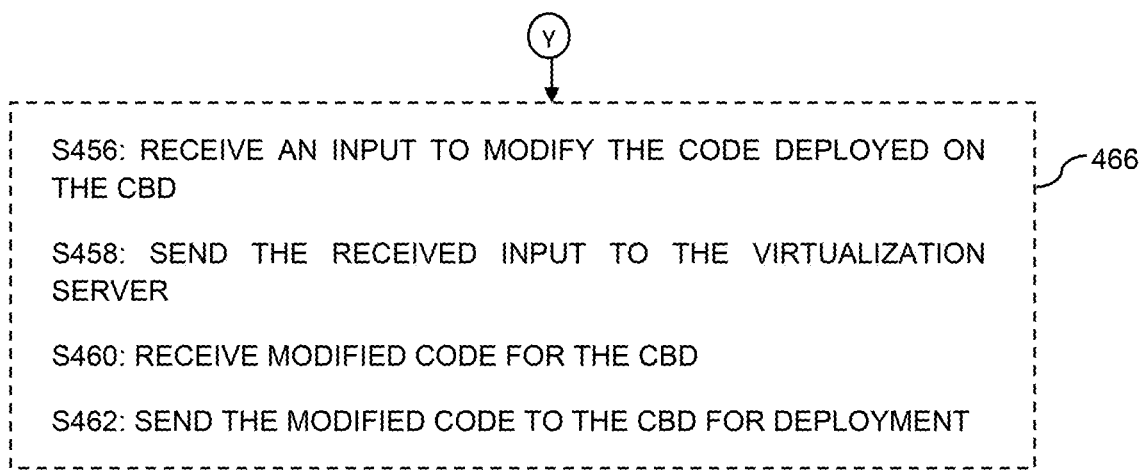

FIGS. 4A-4C depict a flow diagram of a method 400 implemented at the user device 104 via the GUI 102 for design and management of the smart PLC solution, according to embodiments of the invention. The method 400 starts at step 402, at which the method 400 connects an existing PLC solution (e.g. the PLC 112 and the industrial system 120 of FIG. 1) to a cloud network, for example the network 108. The method 400 accomplishes this connection by virtue of the CBD 110 coupled communicably to the PLC 112 and the network 108, where both the PLC 112 and the CBD 110 are remote to the user device 104. At step 404, the method 400 connects to a virtualization server, for example the virtualization server 122, remote to the user device 104, the CBD 110 and the PLC 112. At step 406, the method 400 displays, via the GUI 102, a graphical representation of a pin layout of the PLC 112, and at step 408, the method 400 receives an input corresponding to at least one pin (a first pin), a sensor or an actuator, and one or more parameter(s) for the sensor or the actuator. As step 410, the user device 104 sends the received input to the virtualization server 122, and particularly to the device applications component 202. In some embodiments, the inputs include ladder logic control inputs associated with the pin, the sensor or the actuator and the associated parameter(s). At the virtualization server 122, the device applications component 202 automatically builds an executable PLC application, for example, the PLC application 117, for installation on the PLC 112. At step 412, the user device 104 receives the executable PLC application 117, and at step 414, the user device 104 sends the PLC application 117 to the PLC 112 for deployment thereon. In some embodiments, the PLC application 117 is sent via the CBD 110 to the PLC 112. The steps 406-414 are represented by a combined sub-process 416, which represents automatic generation of the PLC application 117 for the PLC 112.

The method 400 proceeds to step 418, at which the method 400 receives a selection of a predefined process for being executed on a virtualization server, in conjunction with execution of a code on a controller-based device (CBD), for example, the CBD 110. At step 420, the method 400 sends the selection of the predefined process to the virtualization server 122. For example, the selection is processed at code and SDK generation component 200 on the virtualization server 122, which generates a code 248 comprising a call 249 for execution of a predefined process from the library 206 on the CBD 110. The call 249 is configured to call the predefined process on the library 206, for execution by the execution engine 208. At step 422, the method 400 receives the executable code 248 comprising the call 249 from the virtualization server 122. At step 424, the method 400 sends the code 248 to the CBD 110 for deployment thereon. The steps 418-424 are represented by a combined sub-process 426, which represents automatic generation of the code 248 for the CBD 110.

The method 400 proceeds to step 428, at which the method 400 receives a request for displaying a graphical representation of the operation of the PLC 112. At step 430, the method 400 sends the request from the user device to the virtualization server 122. The virtualization server 122 stores the PLC data in the data store 210 and/or sends the PLC data using the PLC analytics module 212, optionally conducting analytics thereon. At step 432, the user device 104 receives the visualization data corresponding to the operation of the PLC from the virtualization server 122. At step 434, the user device displays the graphical representation of the operation of the PLC based on the visualization data on the GUI 102. The steps 428-434 are represented by a combined sub-process 436, which represents displaying PLC data graphically.

The method 400 proceeds to step 438, at which the method 400 receives a request to modify a deployed PLC application, for example the PLC application 117. At step 440, the graphical representation of the PLC including the configuration of the PLC (e.g. the pins and associated sensor/actuator and parameter(s) by the PLC application 117 is displayed on the GUI 102. At step 442, the method 400 receives an input for modifying the PLC application. The input for modification may include modifying a currently configured pin (e.g. the first pin), or adding a new pin (a second pin). The input for modifying the first pin includes inputs for modifying the selected sensor or the selected actuator, or the parameter for the operation of the selected sensor or the selected actuator. The input for adding the second pin includes a selection of the second pin from the plurality of pins, a selection of a sensor or an actuator configured to be coupled with and operated by the PLC 112 via the second pin, and parameter(s) for the operation of the selected sensor or the selected actuator for the second pin. At step 444, the user device 104 sends the received modification input to the virtualization server 122. The virtualization server 122, in a manner similar to that described with respect to sub-process 416 generates a modified PLC application based on the received inputs. At step 446, the user device 104 receives, from the virtualization server 122, the modified PLC application for execution on the PLC. In some embodiments, modification of the PLC application 117 requires an associated modification of the code 248 deployed on the CBD 110. In such embodiments, the virtualization server also generates a modified code for the CBD 110 based on the received inputs in a manner similar to that described with respect to the sub-process 426. At step 448, the method 400 optionally receives a modified code snippet for execution on the CBD 110. At step 450, the method 400 sends the modified PLC application to the PLC for being deployed on the PLC, and optionally, at step 452, the method 400 sends the modified code to the CBD 110 for being deployed on the CBD 110. The steps 438-452 are represented by a combined sub-process 454, which represents modification of a PLC application.

The method 400 proceeds to step 456, at which the method 400 receives an input to modify the code deployed on the CBD. The input for modification may include a change in the parameters of the predefined process, a selection of a different predefined process, among several others. At step 458, the method sends the received input to the virtualization server 122. The virtualization server 122 generates a modified code for the CBD 110 based on the received inputs in a manner similar to that described with respect to the sub-process 426. At step 460, the user device 104 receives modified code for the CBD 110, and at step 462, the user device 104 sends the modified code to the CBD 110 for deployment thereon. The steps 456-464 are represented by a combined sub-process 466, which represents modification of a code for the CBD.

The method 400 proceeds to step 468, at which the method 400 ends. According to various embodiments, the predefined process is executed by the call 249, which is placed based on a condition of the PLC 112 or the industrial system 120 being met, on a trigger command sent from the user device 104, or in course of execution of the code 248 on the CBD 110.

According to some embodiments, communication between various components such as the user device 104, the CBD 110, the PLC 112, the virtualization server 122 and the remote service(s) 130 require registration and/or authentication of such components with other components. For example, in order to request for executing a predefined process on the virtualization server 122 via the call 249, the CBD 110 may be either registered with the virtualization server 122, or be required to authenticate to the virtualization server 122 before the call 249 is executed, or both. Similarly, the predefined processes executed on the virtualization server 122 must be registered with and/or authenticate into the remote service(s).

According to various embodiments, the method 400 above enables the user to manage and visualize data, update code over the air (OTA) and re-program any device on which code snippets and/or PLC applications have been deployed, including different PLC MCUs from different vendors, CPUs, FPGAs, and the like, in a secure and reliable manner.

Figure 5:
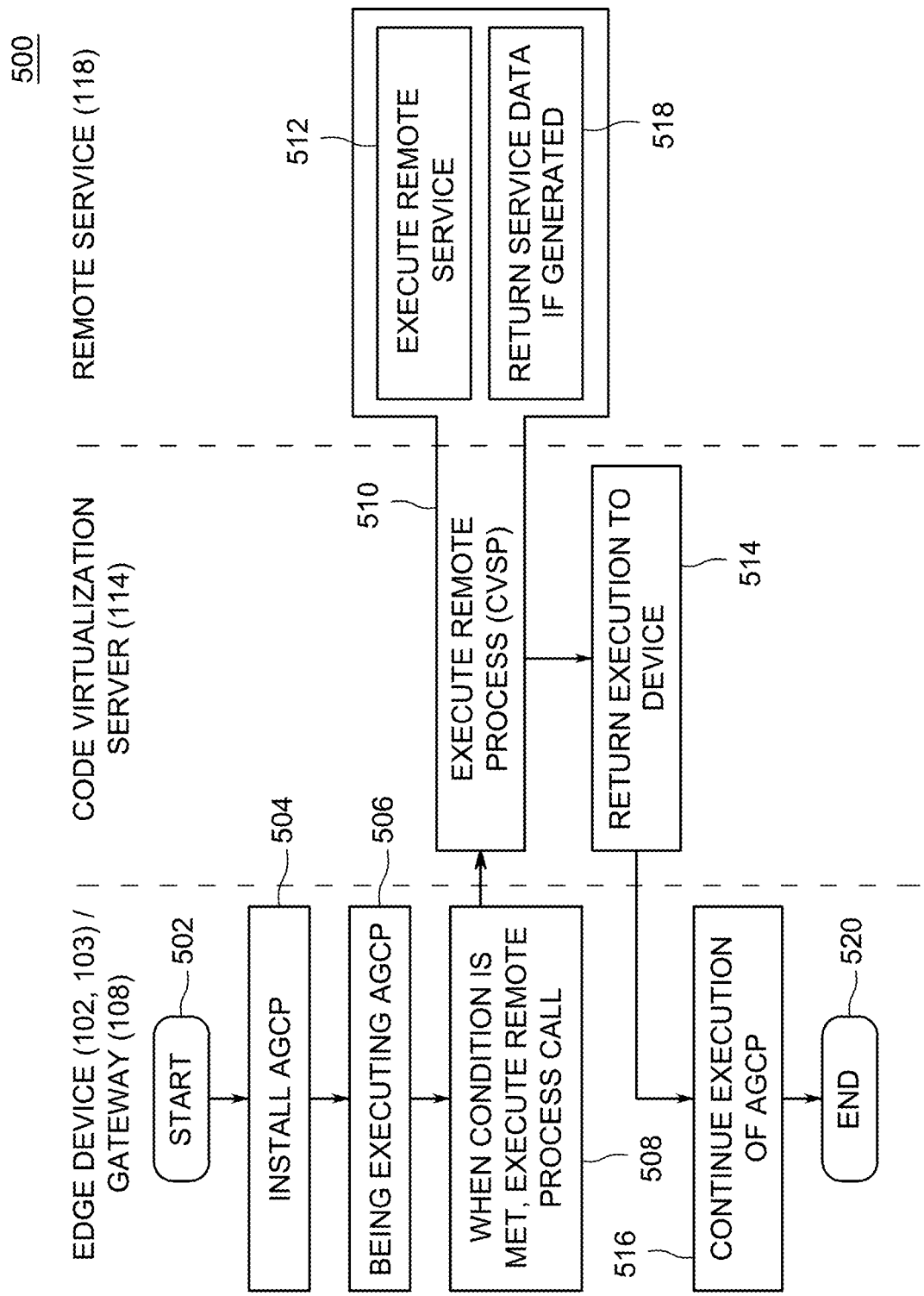
FIG. 5 is a flow diagram illustrating a method for operation of a smart PLC solution executed on the apparatus 100, in accordance with an embodiment of the invention.

FIG. 5 is a flow diagram illustrating a method 500 for operation of a smart PLC solution executed on the smart PLC 111, the CBD 110, the virtualization server 122, and the remote service(s) 130, in accordance with an embodiment of the invention. The method 500 starts at step 502 on the CBD 110, and proceeds to step 504 at which the method 500 installs the code 248 on the CBD 110. For example, the code 248 is received from the user device 104, from the step 424, 452 or 462. The code 148 includes predefined program code or process associated with the CBD 110, and a corresponding supporting code components (e.g., a software development kit (SDK)). The code 248 includes the call 249 to a remote device (e.g., the virtualization server 122) for executing a predefined process corresponding to a desired functionality for the smart PLC 111 comprising the CBD 110, received as input on the GUI 102. For example, the call 249 is directed to a predefined process on the virtualization server 122. At step 506, the method 500 begins executing the code 248 by the CBD 110, and at step 508, the method 500 upon determining that a condition for executing the call to the predefined processes is met, executes the call 249. The condition includes encountering code corresponding to placing the call 249. In some embodiments, the call 249 is placed if a particular condition of the operational parameters of the industrial system 120 or the PLC 112 is met, for example, if a parameter is out of bounds specified for acceptable operation of the PLC 112 or the industrial system 120.

The method 500 proceeds to step 510 at the virtualization server 122, at which the predefined process in the library 206 is executed using the execution engine 208. The method 500 proceeds to step 514, at which the execution of the predefined process on the virtualization server 122 is complete, and the execution of the method 500 is returned to the CBD 110. In some embodiments, execution of the predefined process includes execution or interaction with a remote service(s). That is, the code 248 and the call 249 is configured to execute the remote service(s) 130, and in such embodiments, the step 510 further comprises steps 512, at which the method 500 shifts to the remote service(s) 120, executed by a device remote to the controller devices, the virtualization server 122 and the user device 104. The method 500 executes the remote service(s) at step 512, and proceeds to step 514, at which the method 500 returns service data, if generated by the execution of the remote service(s) 130, to the step 510, and the method 500 proceeds to step 514. At step 516, the method 500 continues the execution of the code 248 on the CBD 110, through to completion. In some embodiments, the further execution of the code 248 may include sending information for display on the GUI 102, for example, displaying PLC data in a graphical visualization, in step 434 of the method 400. In some embodiments, the code execution may complete at the step 514 on the virtualization server 122, and no additional execution of code may take place at step 516. The method 500 proceeds to step 520, where the method 500 ends.

Figure 6:
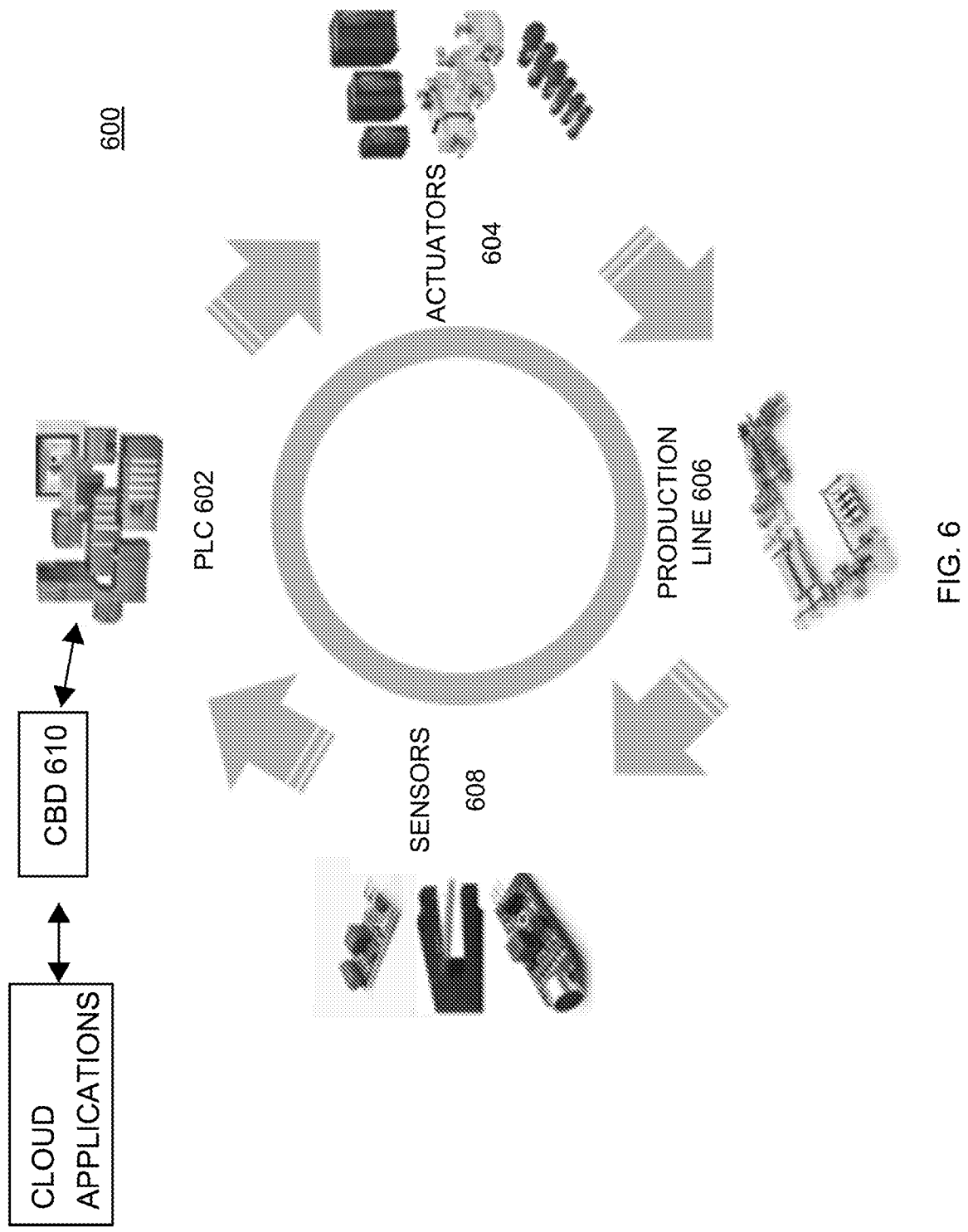
FIG. 6 depicts smart IoT based PLC solution created and deployed in conjunction with the conventional PLC system, in accordance with an embodiment of the invention.

FIG. 6 depicts a conventional PLC system, with a smart IoT solution created and deployed in conjunction with the PLC system, and connected to the cloud applications made available by the virtualization server 122 of FIG. 1 via a CBD 610, in accordance with an embodiment of the invention. The conventional PLC system comprises one or more PLCs 602, actuators 604 coupled to a production line 606, and sensors 608 deployed in the production line 606. According to embodiments of the invention, the smart IoT solution comprises the gateway device 610, which communicably couples the PLC 602 to the virtualization server 122. The CBD 610 enables PLC data streaming, reprogram and management of code 248 being executed on the CBD 610. The code on the CBD 610 (e.g. the code 248) is readily configurable via the GUI 102, can be modified for adding or deleting functionalities, and provides a gateway to modify, manage and regulate to the operations of the conventional PLC, e.g. the PLC 602. In this manner, the conventional PLCs 602 are transformed into smart, dynamically programmable devices, turning the conventional PLC system to an IoT based, smart, dynamic PLC system 600.

Figure 7:
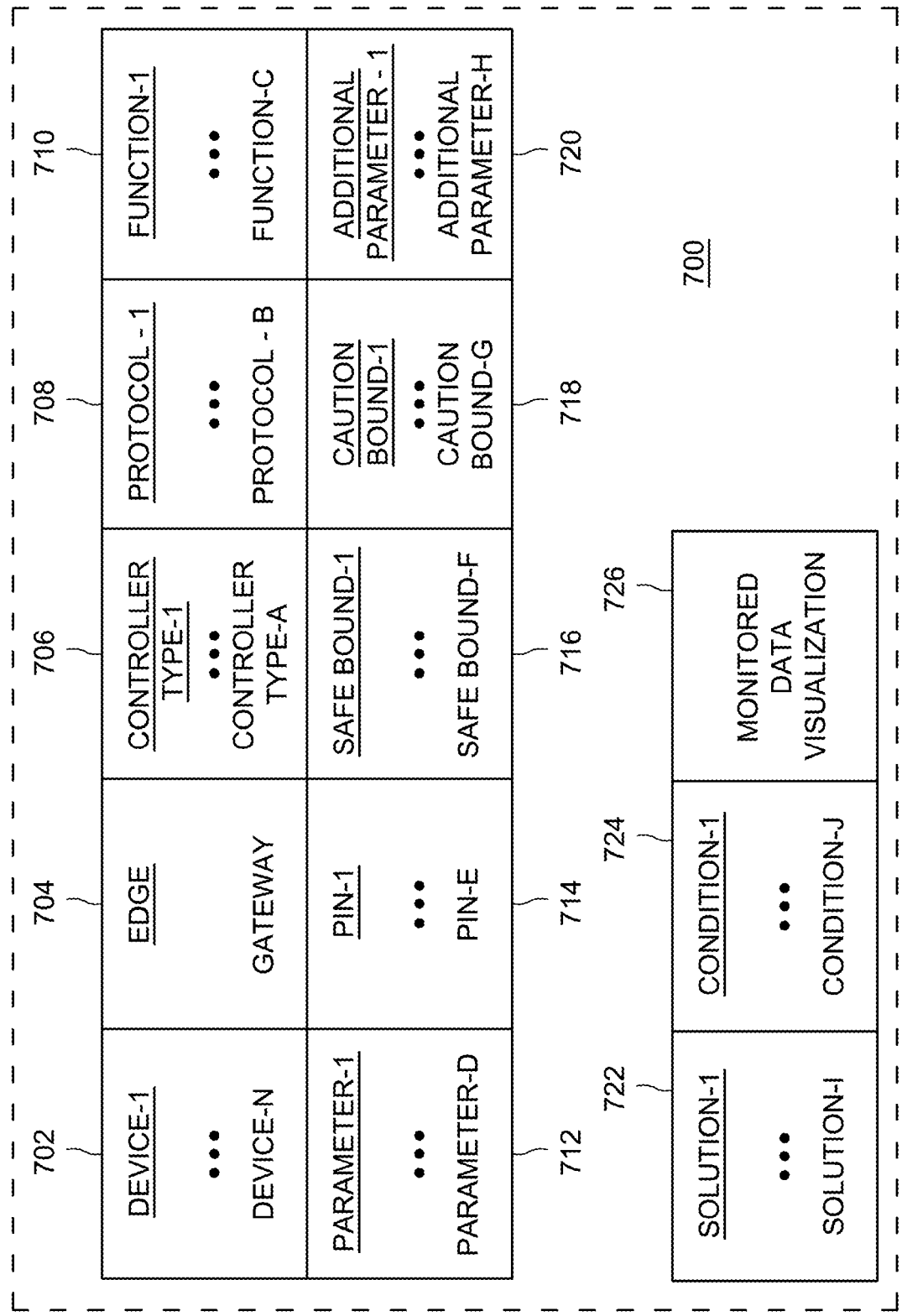
FIG. 7 depicts a graphical user interface (GUI) similar to the GUI of FIG. 1, in accordance with an embodiment of the invention.
Figure 8:
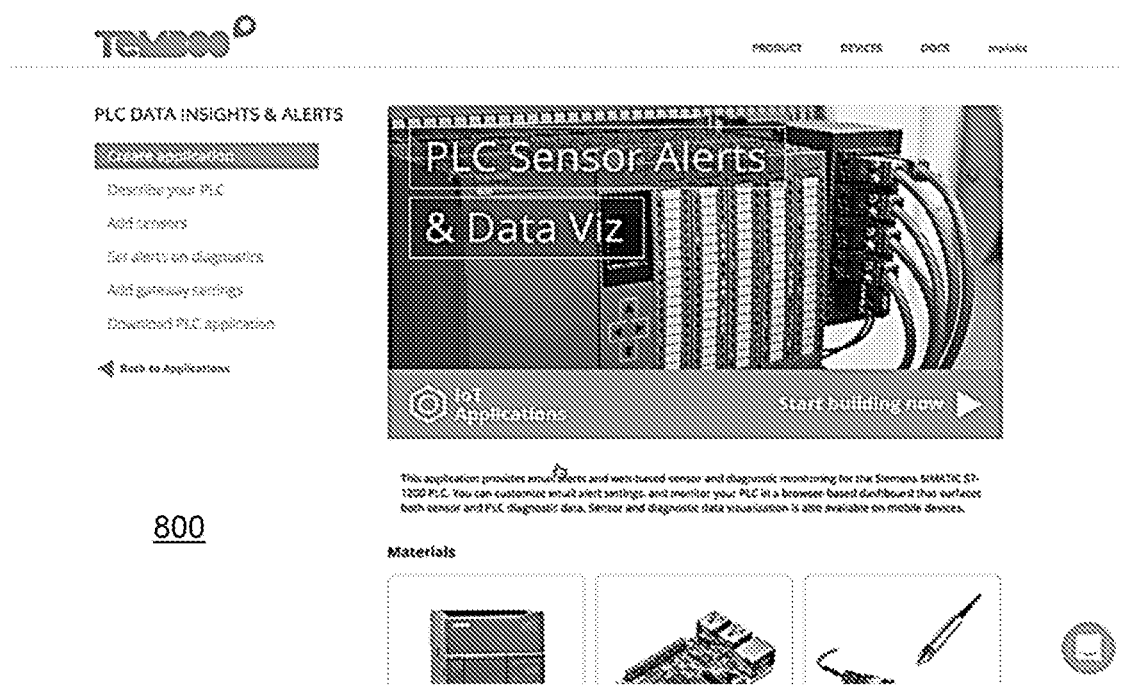
FIGS. 8-17 are screenshots of a graphical user interface (GUI) 800, in accordance with an embodiment of the invention.

FIG. 7 depicts a graphical user interface (GUI) 700 similar to the GUI 102 of FIG. 1, in accordance with an embodiment of the invention. The GUI 700 can take many forms, for example, as described below with respect to FIGS. 8-17, among several others that will occur readily to those skilled in the art. The GUI 700 presents, to a user of a user device on which the GUI 700 is displayed, various GUI elements 702-726 for receiving information graphically, for example, for consumption by the user, and for providing inputs corresponding to each of the GUI element 702-726, for example by user manipulation of the GUI elements 702-726. The GUI elements 702-726 include information relating to, and user input fields for configuring the desired solutions, parameters of the solution or components thereof, information relating to the monitored data of a parameter of the conventional solution. Specifically, the GUI 700 illustrates that the GUI element 702 relates to controller devices, for example, similar to CBD 110. In some embodiments, the GUI element 702 may be implemented as a drop down list for selection by the user, and the GUI element 702 illustrates that the device marked by underlining, DEVICE-1, is selected by the user from the list.

The GUI element 704 is for providing an input corresponding to whether the controller device is an edge device or a gateway device. The GUI element 706 relates to the controller type, for example, one of the controller types listed in TABLE 1. The GUI element 708 relates to communication protocols, for example, as listed in TABLE 1. The GUI element 710 relates to predefined processes or choreos that need to be called from the CBD, for example, via the remote call 249 in the code 248 for executing the virtualization server 122. The GUI element 712 relates to one or more parameters of a selected solution or components thereof, including the parameters related to conventional systems. The GUI element 714 relates to selection of a pin on the controller of the controller device. The GUI elements 716 and 718 relate to boundary parameters, for example safe bounds for identifying safe operational limits for a monitored parameter, in the GUI element 716, and/or caution bounds for sending alerts when the monitored parameter is outside the caution bounds, in the GUI element 718. The GUI element 720 relates to any additional parameters of the selected solutions or conventional systems, for example, if two parameters selected in 712 are related. The GUI element 722 relates to controller based remote solutions, for example, as generated using the embodiments described herein. The GUI element 724 relates to a condition of the conventional system, which when met, triggers the execution of the remote call from the controller device to execute a function or a choreo at the code virtualization server. The GUI element 726 relates to visualization of monitored data of a parameter of the conventional system.

The GUI elements 702-726 may be implemented as a drop down list, a check list, an icon list, radio buttons, a data input form for entering alphanumeric characters, among several others as known in the art. The GUI element 726 may further present data graphically, for example as line charts, area charts, scatter diagrams, pie charts, bar charts, among several other graphical representations of data known in the art. While only the GUI element 726 is illustrated as presenting visualization data, other GUI elements 702-724 may also present visualization data corresponding to the relevant fields presented therein.

According to various embodiments, GUI elements include ability to select plurality of bundles which visually show different group of predefined processes (for CBDs) and applications (for PLCs), documentation for every process and applications and a complete application code generator covering all programming languages supported by PLCs and the CBDs. GUI elements also include options to enable testing of the smart PLC applications without actually deploying the generating executable code on the PLC, for example, using sandboxing techniques. In some embodiments, the GUI elements include an interface allowing a user to set conditions to trigger execution of the predefined process from the user device. GUI elements include interface to set up data streaming condition on a remote device, allowing user to assign the defined conditions (on streaming and remote process calls management) to particular I/O (inputs/outputs) of a device electronics (MCU, SoC, etc.), and allowing user to define relationships between remote devices (edge device/gateway/independent device) and how data are transported between devices (transfer protocol selection). The GUI elements also include interfaces for generating code for the CBD including process calls and conditions for execution and data management in any given programming language, for each device, and interfaces allowing a user to easily manage and re-program any device on which code snippets and/or applications have been deployed. Some exemplary screenshots of such GUI elements are shown with respect to FIGS. 8-17.

Figure 9:
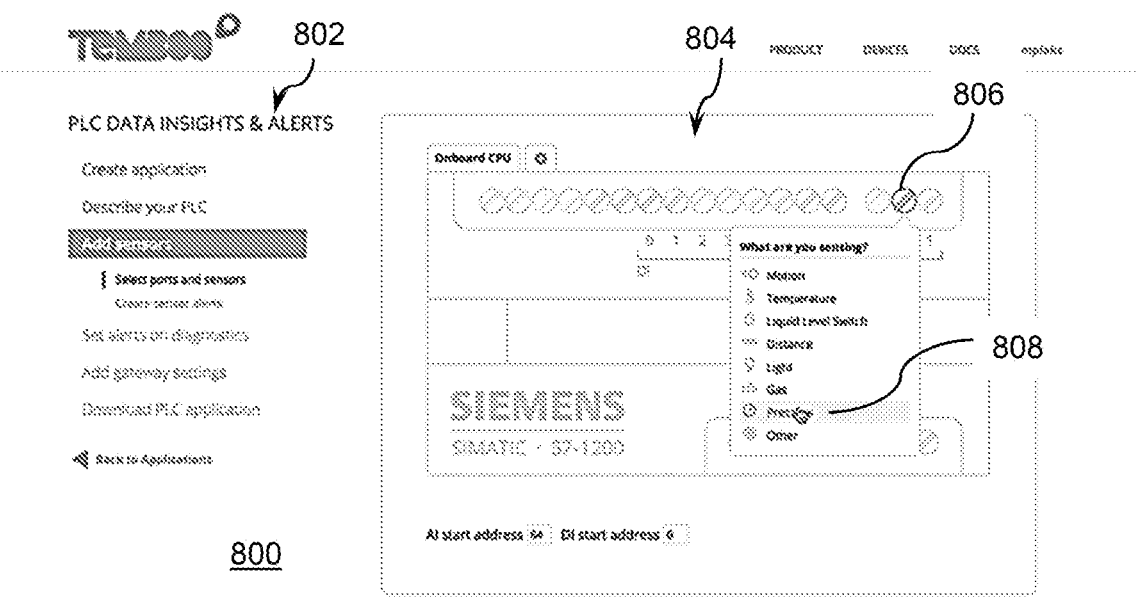
Figure 10:
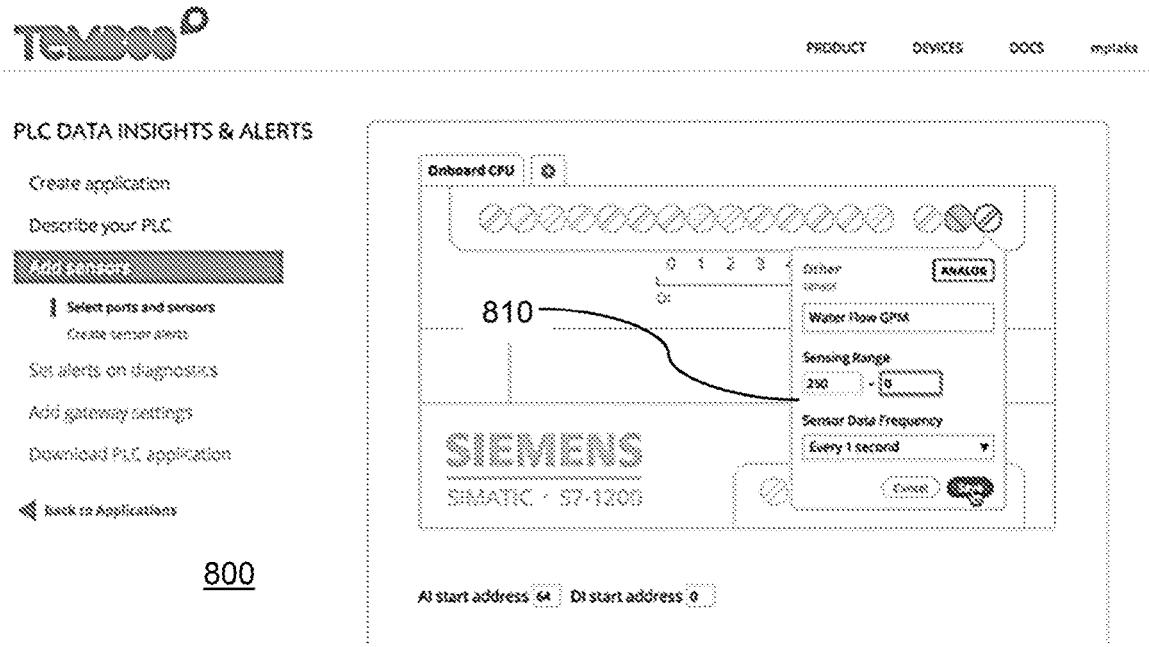
Figure 11:
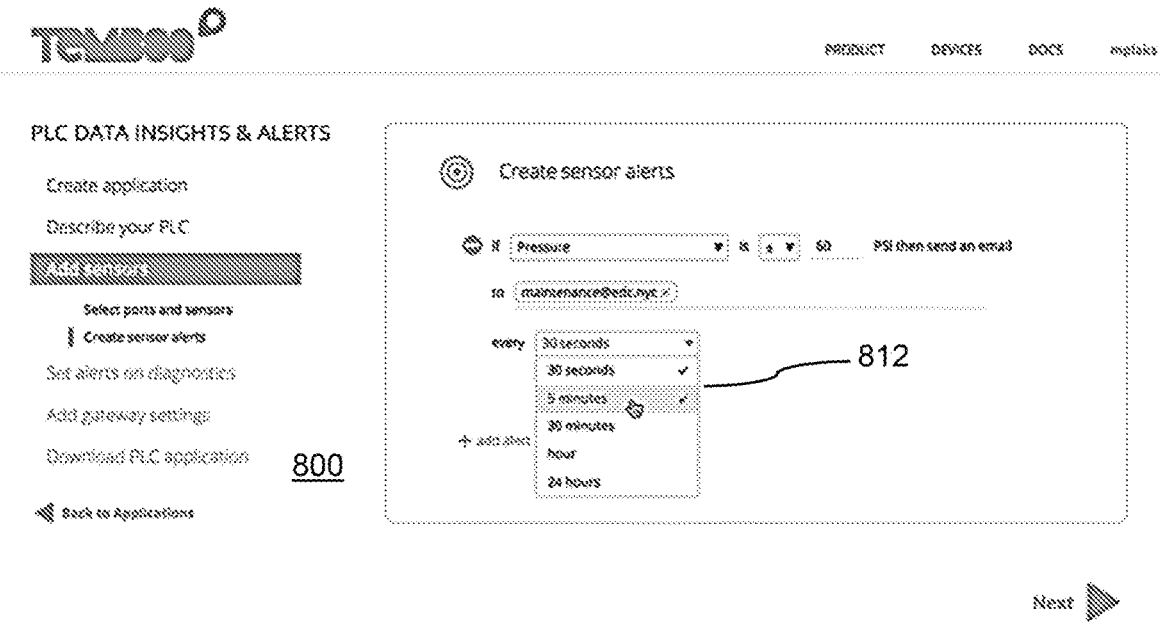

FIGS. 8-17 are screenshots of a graphical user interface (GUI) 800, in accordance with an embodiment of the invention. The GUI 800 is similar to the GUI 102, and enables access of (connectivity to) a remote device, such as the virtualization server 122, for creating and managing smart PLC solutions. The screenshots show GUI 800 in use to generate a PLC application for a PLC (e.g., PLC 112) and code for a CBD (e.g., CBD 110) for use in a smart PLC (e.g., PLC 111). Upon selecting to create an application for PLC from the "Create Application" menu option in FIG. 8, a predefined PLC is selected. For example, the GUI 800 shows SIEMENS® SIMATIC S7-1200 PLC as the default PLC in the screenshot of FIG. 9 and the option "ADD SENSORS" selected in a menu 802, and corresponding elements, for example, a pin layout 804 showing multiple pins; and a sensor type selection list corresponding to a selection of a first pin 806. The pin layout corresponds to the actual I/O pins in a PLC, for example, the PLC 112. FIG. 9 illustrates that the user selects pressure sensor 808, which is predefined in the GUI 800, and defines parameters for the pressure sensor. In this manner, the pressure sensor represented by 808 is configured on the first pin 806. FIG. 10 shows another example, in which the user has selected "Other" in the list, indicating that the sensor type which the user wishes to configure on the first pin 806 is not predefined in the GUI 800. The GUI 800 provides an option to the user to define the sensor, as seen in FIG. 10, by presenting an option 810 to define the sensor name, sensing range value and data frequency. The user may configure the sensor parameters and save the sensor, thereby defining a "Water Flow GPM" sensor, for example, on a second pin. The user may then configure the solution to send an email to a particular email ID (e.g. "maintenance@ed.nyc.edu") if a given condition (e.g., if pressure is less than or equal to 60 pounds per square inch (psi)). The user may also configure the frequency at which a check is made, and selects, for example, a frequency interval of 5 minutes from a drop down selector 812, as shown in FIG. 11.

Figure 12:
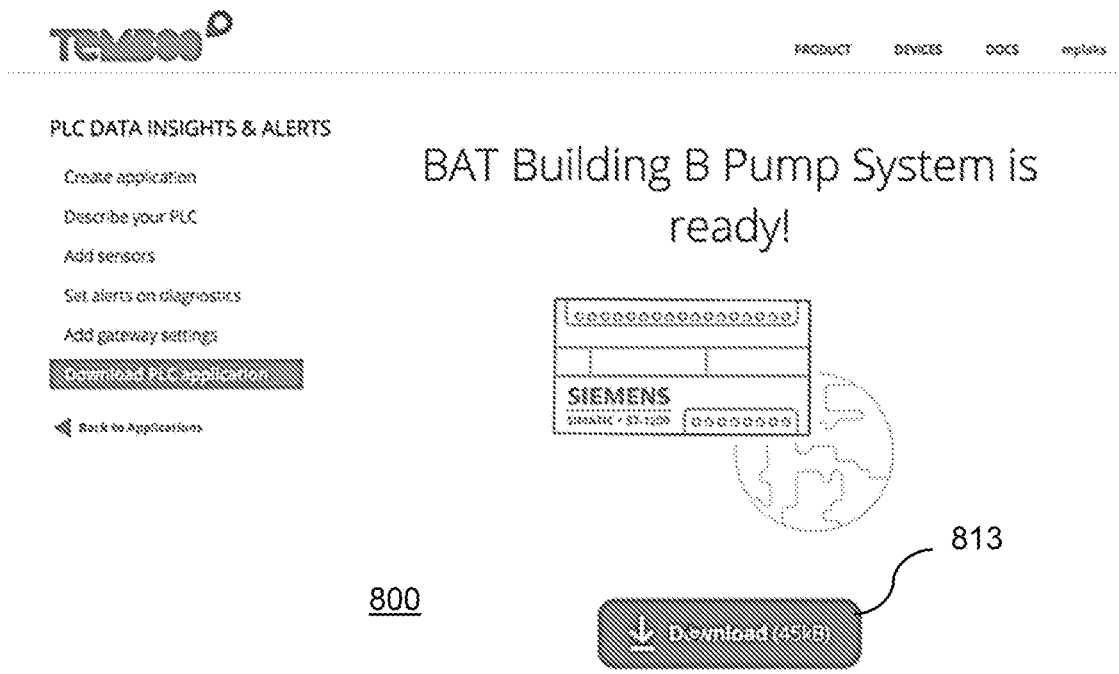

In this manner, a smart PLC application is ready to download using a download button 813 as shown in FIG. 12. The downloaded smart PLC application may then be sent to the smart PLC 111 for deployment. In some embodiments, the PLC application includes executable application only for the PLC 112, or only for the CBD 110, or both. While generation of the PLC application 117 for the PLC 112 is a separate process than the generation of the code 248 for the CBD 110, the PLC application 117 and the code 248 (comprising the call 249) may be downloaded together in a single package, and the user experience for generation of such executable codes is seamless. The user may send the downloaded application to the CBD 110, which further installs the PLC application 117 to the PLC 112 and the code 248 on the CBD 110. In some embodiments, the user may install the PLC application 117 and the code 248 individually on the PLC 112 and the CBD 110, respectively.

Figure 13:
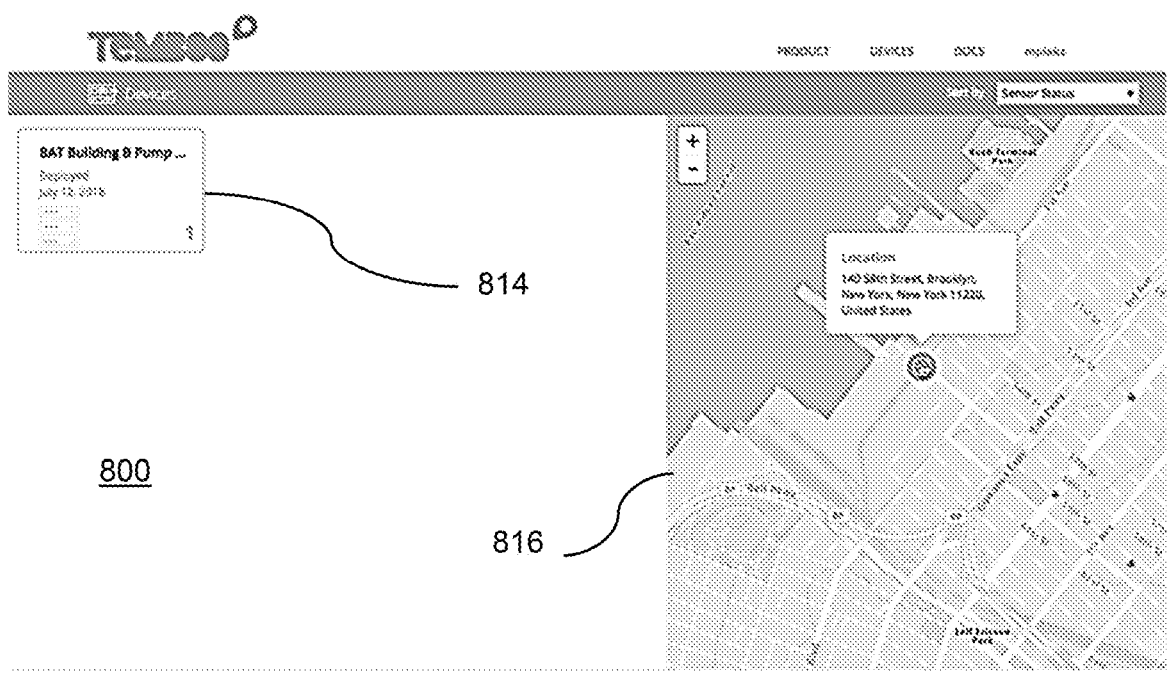
Figure 14:
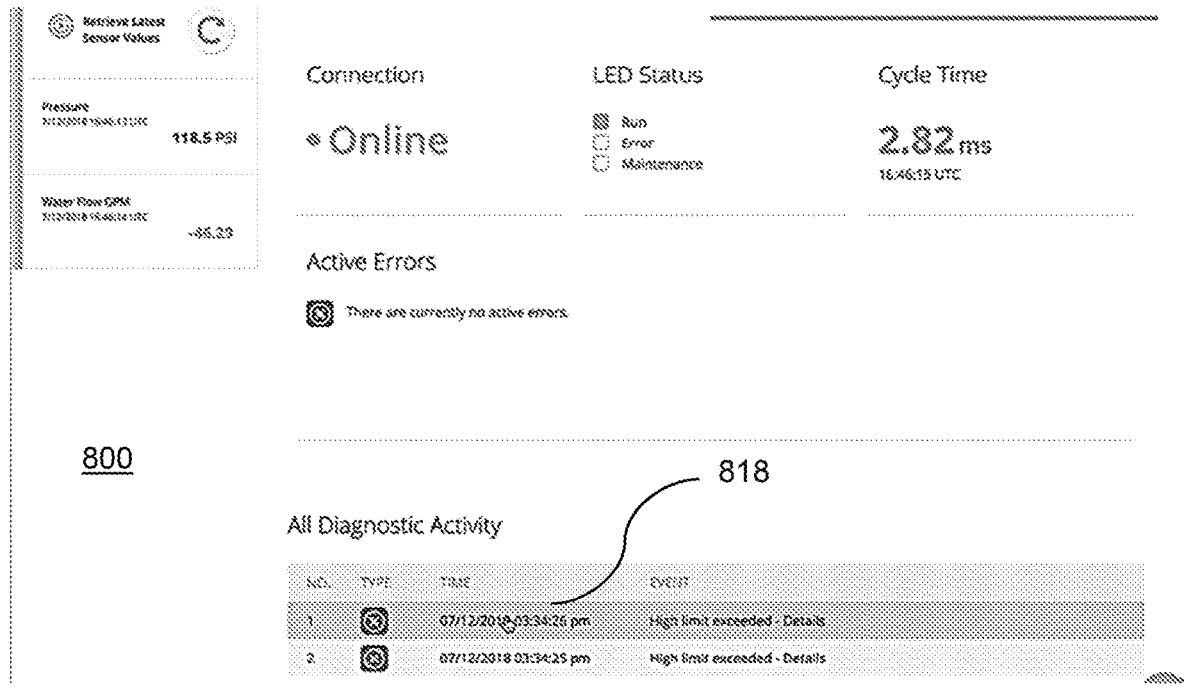
Figure 15:
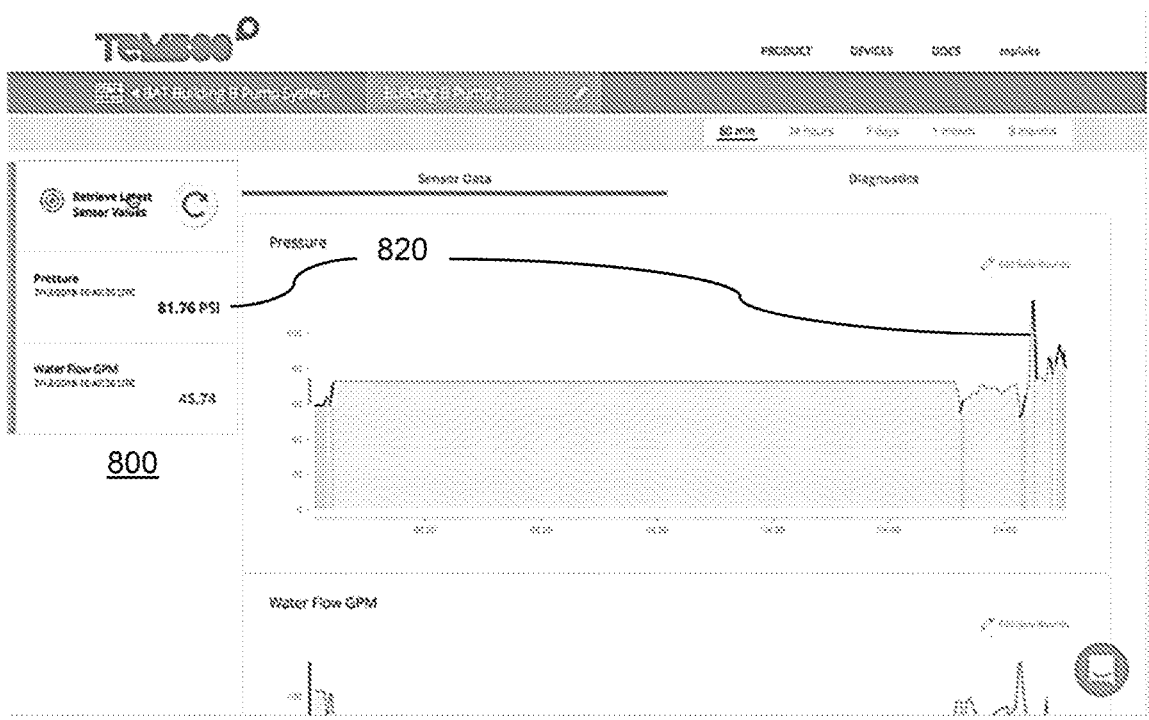
Figure 16:
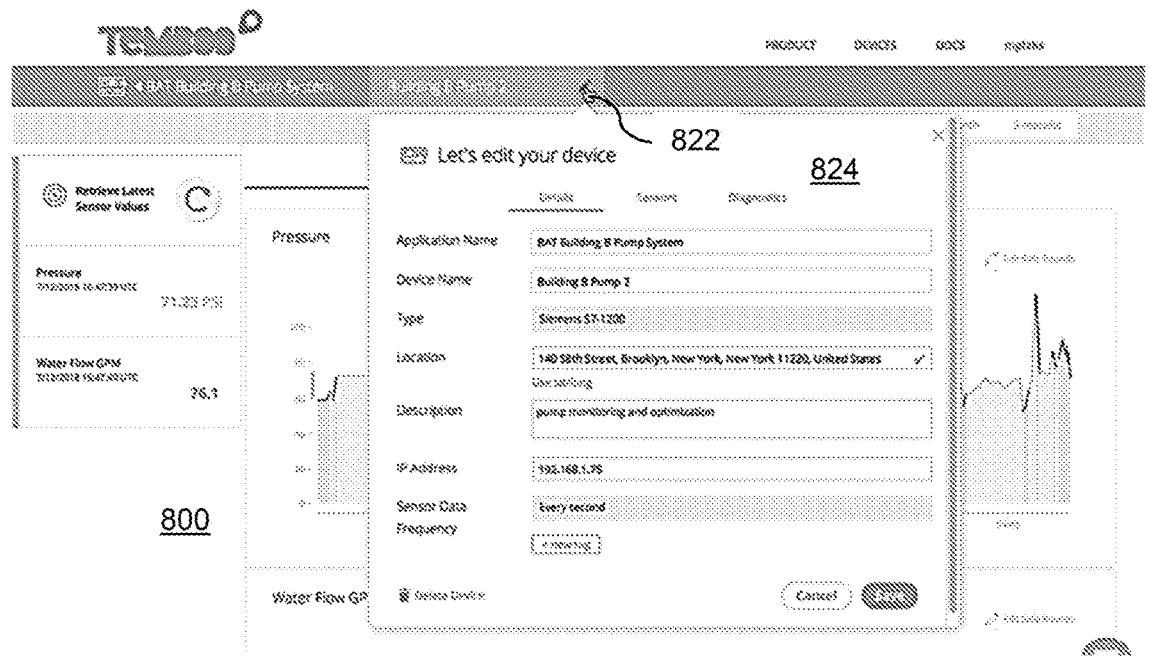
Figure 17:
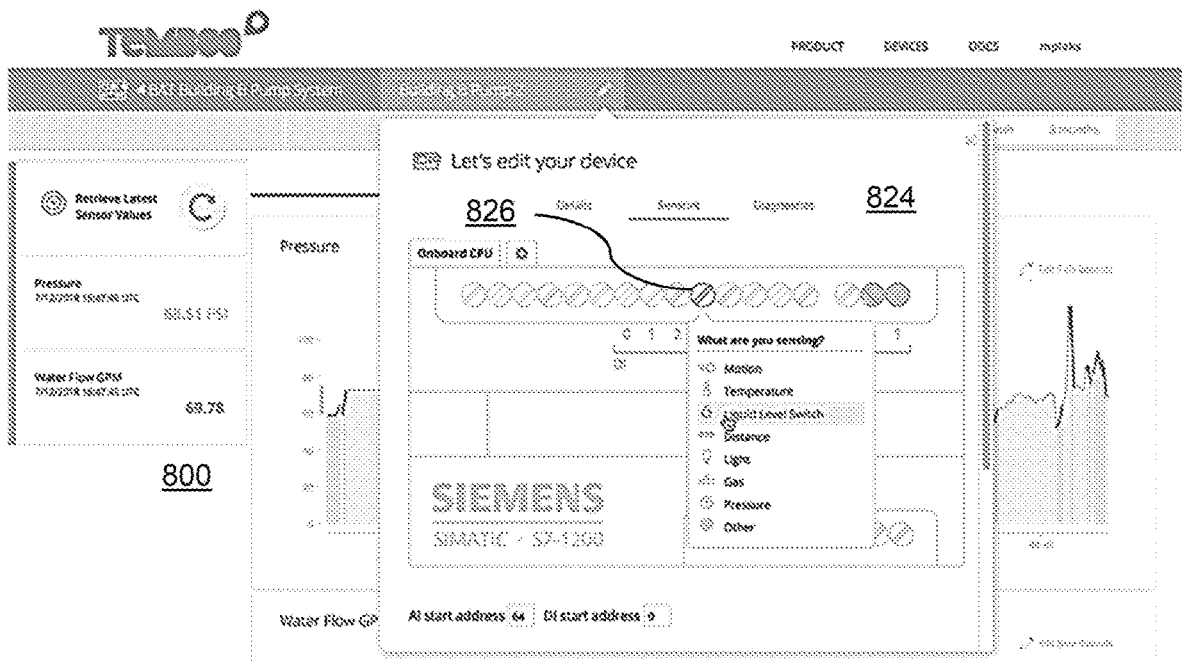

According to an embodiment, the deployed solution may be seen in a geographical context, for example, as seen in FIG. 13, where the solution downloaded in FIG. 12 is seen in the icon 814, and the location of deployment (smart PLC 111) is seen in an annotated map 816. A user can monitor and manage (reconfigure, modify) the smart PLC solution from the GUI 800 as well. For example, the user selects the icon 814 or the annotation corresponding to the deployed solution to arrive at screens corresponding to screenshots shown in FIGS. 14 and 15. In FIG. 14, the user can see from a history chart 818 that the pressure sensor recorded exceeding high limit. The user may select to view graphical representation of PLC data, for example as seen by the graph in FIG. 15, and referenced by numeral 820. In view of the performance which exceeded the high limit, the user may reconfigure the pressure sensor, for example, by selecting an edit icon 822 as shown in FIG. 16, which generates another input screen 824. The input screen has options such as "Details", "Sensors" and "Diagnostics" which allow the user to modify the configuration of the sensor, completely redesign the sensor. In some embodiments, the user can configure another sensor on yet another pin 826, as can be seen in FIG. 17, in a manner similar to configuring a new sensor as discussed with respect to FIGS. 9-11 above. For example, the user may define new safe bounds (limits at which the PLC will shut down, warning limits, at which the smart PLC 111 will send out a warning alert by email or another mode as configured, for example, in a manner similar to FIG. 11.

Therefore, such and other similar GUIs can be utilized for configuring a smart PLC solution, which includes generating an executable application for the PLC 112 and for the CBD 110 automatically, based on the inputs provided by the user on via the GUI 800 or 102, on the user device, which is remote to the PLC 112, CBD 110 and the virtualization server 122. In this manner, a user may conveniently design, create, deploy, monitor, modify and mange smart PLC solutions using a laptop, tablet or a desktop computer, using graphical designing methodology via the GUI 800 (102). The smart solutions generated herein enable IoT connectivity for conventional PLC solutions, and impart easy to configure functionalities not readily possible or available for conventional PLC solutions.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for creating and managing a smart dynamic programmable logic controller (PLC) based solution from an existing PLC solution, the method comprising:
connecting the existing PLC solution to a cloud network;
connecting, from a user device, to a virtualization server;
displaying, on a graphical user interface (GUI) on the user device, a graphical representation of a pin layout of a PLC, the pin layout comprising a plurality of pins;
receiving, on the GUI, an input comprising selection of a first pin from the plurality of pins, a selection of a sensor or an actuator configured to be coupled with the PLC via the first pin, and a parameter for the operation of the selected sensor or the selected actuator;
sending the received input from the user device to the virtualization server remote to the user device and the PLC;
receiving, at the user device from the virtualization server, an executable PLC application for execution on the PLC, the PLC application configured to operate and/or monitor the PLC according to the received input; and
sending the PLC application to the PLC for being deployed on the PLC,
wherein the user device is remote to the PLC, and the virtualization server is remote to the user device and the PLC.

2. The method of claim 1, further comprising:
receiving, on the GUI, a selection of a predefined process for execution on the virtualization server;
sending, from the user device, the selection of the predefined process to the virtualization server;
receiving, at the user device from the virtualization server, an executable code snippet for being executed on a controller-based device (CBD), the code snippet when executed on the CBD is configured to place a call from the CBD to the virtualization server to execute the predefined process on the virtualization server; and
sending, from the user device, the executable code snippet to the CBD for being deployed on the CBD,
wherein the CBD is communicably coupled to the PLC via MOD-BUS protocol,
wherein the PLC application is configured to send operational information of the PLC to the CBD, and
wherein the code snippet is configured to send the operational information to the virtualization server.

3. The method of claim 2, further comprising:
receiving, via the GUI, an input for a condition of the sensor or the actuator; and
sending the input condition to the virtualization server,
wherein the call is placed when the condition is met,
wherein the code snippet is received at the user device along with the PLC application,
wherein the PLC application is built using ladder logic, wherein the code snippet is built in a programming language according to a selection of programming language received as input on the GUI.

4. The method of claim 2, further comprising:
receiving, on the GUI, a request for displaying a graphical representation of the operation of the PLC;
sending the request from the user device to the virtualization server;
receiving, at the user device from the virtualization server, visualization data corresponding to the operation of the PLC; and
displaying, on the GUI, the graphical representation of the operation of the PLC based on the visualization data.

5. The method of claim 4, further comprising:
receiving, on the GUI, a request to modify the PLC application;
presenting, on the GUI, the graphical representation of the PLC including the configuration of the PLC by the PLC application;
receiving, on the GUI, at least one of:
an input for modifying the first pin by modifying the selected sensor or the selected actuator, or the parameter for the operation of the selected sensor or the selected actuator, or
an input for adding a second pin from the plurality of pins, wherein the input comprises a selection of a sensor or an actuator configured to be coupled with and operated by the PLC via the second pin, and a parameter for the operation of the selected sensor or the selected actuator;
sending the received input from the user device to the virtualization server;
receiving, at the user device from the virtualization server:
an executable modified PLC application for execution on the PLC, the modified PLC application modified based on the received input, and
an executable modified code snippet for execution on the CBD, the code snippet modified based on the received input;
sending the modified PLC application to the PLC for being deployed on the PLC; and
sending the modified code snippet to the CBD for being deployed on the CBD.

6. The method of claim 5, wherein the received input comprises a selection of at least one of a communication configuration of the CBD; a communication protocol for the CBD; a type of the CBD; a Modbus mapping; a trigger notification for executing a portion of the PLC application or the code snippet; a communication mode for communication from the CBD comprising an email address, a phone number or an Internet messaging service ID; or a parameter for the aforesaid selection.

7. The method of claim 6, wherein the PLC is one of a plurality of PLCs deployed in the PLC based solution and the CBD is one of a plurality of CBDs deployed in the PLC based solution, wherein the communication configuration of the CBD includes the states edge, gateway or independent, and wherein the communication protocol for the CBD is configured to enable routing a call from one CBD to another CBD in the plurality of CDBs.

8. The method of claim 2, further comprising
executing a remote service upon execution of the predefined process on the virtualization server,
wherein the remote service is executed by a remote service device communicably coupled with and remote to the virtualization server.

9. The method of claim 1, further comprising:
receiving, on the GUI, an input selection of a machine learning and artificial intelligence (ML/AI) component on the virtualization server, the ML/AI component configured to modify the PLC application based on the PLC operation and an industrial system operated by the PLC;
sending the received input from the user device to the virtualization server;
receiving, at the user device from the virtualization server,
an executable modified PLC application for execution on the PLC, the modified PLC application modified by the ML/AI component, and
an executable modified code snippet for execution on the CBD, the modified code snippet modified by the ML/AI component;
sending the modified PLC application to the PLC for being deployed on the PLC; and
sending the code snippet to the CBD for being deployed on the CBD.

10. The method of claim 9, wherein at least one of the modified PLC application or the code snippet is configured to identify an anomaly in the PLC operation or the industrial system, predict an anomaly in the PLC operation or the industrial system, or both.

11. The method of claim 10, the ML/AI component modifies the at least one of the modified PLC application or the code snippet based on a user-defined constraint comprising at least one of latency, acceptable bracket for triggering of an alert, power saving target, sensor calibration, predictive maintenance, or maximization or minimization of an output.

12. The method of claim 10, further comprising
storing the PLC runtime information in a data store on the virtualization server; and
selecting, on the GUI, the ML/AI component from a list of ML/AI algorithms.

13. An apparatus for creating and managing a smart dynamic programmable logic controller (PLC) based solution from an existing PLC solution, the apparatus comprising:
a user device comprising a processor and a memory storing processor executable instructions which, when executed by the processor, performs a method comprising:
connecting the existing PLC solution to a cloud network,
connecting, from a user device, to a virtualization server,
displaying, on a graphical user interface (GUI) on the user device, a graphical representation of a pin layout of a PLC, the pin layout comprising a plurality of pins,
receiving, on the GUI, an input comprising selection of a first pin from the plurality of pins, a selection of a sensor or an actuator configured to be coupled with the PLC via the first pin, and a parameter for the operation of the selected sensor or the selected actuator,
sending the received input from the user device to the virtualization server remote to the user device and the PLC,
receiving, at the user device from the virtualization server, an executable PLC application for execution on the PLC, the PLC application configured to operate and/or monitor the PLC according to the received input, and sending the PLC application to the PLC for being deployed on the PLC, wherein the user device is remote to the PLC, and the virtualization server is remote to the user device and the PLC.

14. The apparatus of claim 13, wherein the method further comprises:

receiving, on the GUI, a selection of a predefined process for execution on the virtualization server;

sending, from the user device, the selection of the predefined process to the virtualization server;

receiving, at the user device from the virtualization server, an executable code snippet for being executed on a controller-based device (CBD), the code snippet when executed on the CBD is configured to place a call from the CBD to the virtualization server to execute the predefined process on the virtualization server; and sending, from the user device, the executable code snippet to the CBD for being deployed on the CBD, wherein the CBD is communicably coupled to the PLC via MOD-BUS protocol, wherein the PLC application is configured to send operational information of the PLC to the CBD, and wherein the code snippet is configured to send the operational information to the virtualization server.

15. The apparatus of claim 14, wherein the method further comprises:

receiving, on the GUI, a request to modify the PLC application;

presenting, on the GUI, the graphical representation of the PLC including the configuration of the PLC by the PLC application;

receiving, on the GUI, at least one of:

an input for modifying the first pin by modifying the selected sensor or the selected actuator, or the parameter for the operation of the selected sensor or the selected actuator, or an input for adding a second pin from the plurality of pins, wherein the input comprises a selection of a sensor or an actuator configured to be coupled with and operated by the PLC via the second pin, and a parameter for the operation of the selected sensor or the selected actuator;

sending the received input from the user device to the virtualization server;

receiving, at the user device from the virtualization server:

an executable modified PLC application for execution on the PLC, the modified PLC application modified based on the received input, and an executable modified code snippet for execution on the CBD, the code snippet modified based on the received input;

sending the modified PLC application to the PLC for being deployed on the PLC; and sending the code snippet to the CBD for being deployed on the CBD.

* * * * *